(12) United States Patent
Vajapeyam et al.

(10) Patent No.: US 11,265,833 B2
(45) Date of Patent: *Mar. 1, 2022

(54) TECHNIQUES FOR REPORTING TIMING DIFFERENCES IN MULTIPLE CONNECTIVITY WIRELESS COMMUNICATIONS

(71) Applicant: QUALCOMM Incorporated, San Diego, CA (US)

(72) Inventors: Madhavan Srinivasan Vajapeyam, San Diego, CA (US); Masato Kitazoe, Tokyo (JP); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,472

(22) Filed: Feb. 13, 2020

(65) Prior Publication Data

US 2020/0187137 A1 Jun. 11, 2020

Related U.S. Application Data

(63) Continuation of application No. 14/742,442, filed on Jun. 17, 2015, now Pat. No. 10,609,663.

(Continued)

(51) Int. Cl.
*H04W 56/00* (2009.01)
*H04W 24/10* (2009.01)

(52) U.S. Cl.
CPC ......... *H04W 56/001* (2013.01); *H04W 24/10* (2013.01); *H04W 56/0065* (2013.01)

(58) Field of Classification Search
CPC .............. H04W 56/001; H04W 24/10; H04W 56/0065; H04W 56/004; H04W 56/003; H04W 56/0055; H04L 1/00
See application file for complete search history.

(56) References Cited

U.S. PATENT DOCUMENTS 9,155,057 B2 * 10/2015 Song ................. H04W 56/0025
9,167,547 B2 * 10/2015 Suzuki .............. H04W 56/0055
(Continued)

FOREIGN PATENT DOCUMENTS

CN 102340797 A 2/2012
CN 102754468 A 10/2012
(Continued)

OTHER PUBLICATIONS

ETRI: "SFN Handling and SI Change for SCG in Dual Connectivity", 3GPP Draft R2-142117, 3GPP TSG-RAN2 Meeting #86, Seoul, Korea, May 19-23, 2014, May 18, 2014 (May 18, 2014), 4 Pages, URL: http://www.3gpp.org/ftp/tsg_ran/WG2_RL2/TSGR2_86/Docs/R2-142117.zip.

(Continued)

*Primary Examiner* — Kibrom T Hailu
(74) *Attorney, Agent, or Firm* — Dalei Dong; Arent Fox LLP

(57) ABSTRACT

Certain aspects of the present disclosure relate to reporting difference in timing between cells using multiple connectivity in a wireless network. A first connection served by at least a first cell and a second connection served by at least a second cell to facilitate communicating with at least the first cell and at least the second cell are established. A reporting configuration specifying one or more parameters related to reporting a timing difference between cells is received. A timing difference between at least the first cell and at least the second cell is determined, and the timing difference is reported to at least the first cell over the first connection or to at least the second cell over the second connection. This can facilitate scheduling time aligned operations over the first and second cells, or related cell groups, in multiple connectivity.

30 Claims, 13 Drawing Sheets

Related U.S. Application Data

(60) Provisional application No. 62/023,717, filed on Jul. 11, 2014.

(56) References Cited

U.S. PATENT DOCUMENTS

| | | | |
|---|---|---|---|
| 9,204,411 | B2 | 12/2015 | Chen et al. |
| 9,253,670 | B2 | 2/2016 | Kim et al. |
| 9,408,125 | B2 | 8/2016 | Horn et al. |
| 9,763,203 | B2* | 9/2017 | Dinan ............... H04W 74/0833 |
| 10,524,221 | B2 | 12/2019 | Zhang et al. |
| 2010/0054237 | A1 | 3/2010 | Han et al. |
| 2011/0207450 | A1 | 8/2011 | Siomina et al. |
| 2012/0236977 | A1 | 9/2012 | Zou et al. |
| 2012/0307791 | A1 | 12/2012 | Veres et al. |
| 2013/0163532 | A1* | 6/2013 | Anderson ......... H04W 72/1278 370/329 |
| 2014/0002958 | A1 | 1/2014 | Eilertsen |
| 2014/0016111 | A1 | 1/2014 | Harayama et al. |
| 2014/0029586 | A1* | 1/2014 | Loehr ..................... H04B 3/36 370/336 |
| 2014/0146907 | A1 | 5/2014 | Kim et al. |
| 2014/0161111 | A1* | 6/2014 | Kim .................. H04W 56/0045 370/336 |
| 2014/0241329 | A1 | 8/2014 | Lin et al. |
| 2015/0036666 | A1 | 2/2015 | Blankenship et al. |
| 2015/0117287 | A1* | 4/2015 | Kim .................. H04W 72/0453 370/311 |
| 2015/0327198 | A1* | 11/2015 | Axmon ................... H04L 5/001 370/336 |
| 2015/0327280 | A1* | 11/2015 | Zhang .................. H04W 76/20 370/280 |
| 2015/0327322 | A1* | 11/2015 | Huang ................. H04W 24/10 370/329 |
| 2016/0014706 | A1 | 1/2016 | Vajapeyam et al. |
| 2017/0127473 | A1 | 5/2017 | Virtej et al. |
| 2017/0134976 | A1 | 5/2017 | Uchino et al. |
| 2017/0164281 | A1* | 6/2017 | Chiba .............. H04W 72/0446 |
| 2020/0100199 | A1* | 3/2020 | Zhang ..................... H04L 5/001 |
| 2020/0119773 | A1* | 4/2020 | Kim .................. H04W 56/0045 |

FOREIGN PATENT DOCUMENTS

| | | |
|---|---|---|
| CN | 103096456 A | 5/2013 |
| CN | 103202051 A | 7/2013 |
| CN | 103312474 A | 9/2013 |
| JP | 2013516113 A | 5/2013 |
| JP | 2014511640 A | 5/2014 |
| KR | 20110039377 A | 4/2011 |
| KR | 20140054241 A | 5/2014 |
| WO | 2013040026 A1 | 3/2013 |
| WO | 2014008380 A1 | 1/2014 |

OTHER PUBLICATIONS

European Search Report—EP19190100—Search Authority—Munich—Oct. 23, 2019.

Huawei: "SFN Handling in Dual Connectivity", 3GPP Draft; R3-141068 SFN Offset, 3rd Generation Partnership Project (3GPP), Mobile Competence Centre; 650, Route Des Lucioles; F-06921 Sophia-Antipolis Cedex; France, vol. RAN WG3, no. Seoul, Korea; May 19, 2014-May 23 2014, May 18, 2014 (May 18, 2014), pp. 1-3, XP050795619, Retrieved from the Internet: URL: http://www.3gpp.org/ftp/tsg_ran/WG3_Iu/TSGR3_84/Docs/R3-141068.zip [retrieved on May 18, 2014] chapters 1 and 2.

Intel Corporation: "Discussion on SFN timing difference in Dual connectivity", 3GPP Draft; R4-143028, 3RD Seneration Partnership Project (3GPP), Mobile Competence Centre; 650, Route Des-Lucioles; F-06921 Sophia-Antipolis Cedex; France, vol. RAN WG4, no. Seoul, Korea; May 19, 2014-May 23, 2014, May 12, 2014 (May 12, 2014), 7 Pages, XP050823961, Retrieved from the Internet: URL: http://www.3gpp.org/ftp/tsg_ran/WG4_Radio/TSGR4_71/Docs/ [retrieved on May 12, 2014] the whole document.

International Preliminary Report on Patentability—PCT/US2015/036443, International Search Authority—European Patent Office, dated Oct. 4, 2016.

International Search Report and Written Opinion—PCT/US2015/036443—ISA/EPO—dated Sep. 30, 2015.

Qualcomm Incorporated, Measurement gap configuration in Dual Connectivity [online], 3GPP TSG-RAN WG2 Meeting#86, R2-142517, May 19, 2014, 3 pages, URL:http://www.3gpp.org/ftp/tsg_an/WG2_RL2/TSGR2_86/Docs/R2-142517.zip.

RAN3: "Introduction of Dual Connectivity (RAN3 topics)", 3GPP Draft; R2-142959, 3rd Generation Partnership Project (3GPP), Mobile Competence Centre; 650, Route Des Lucioles; F-06921 Sophia-Antipolis Cedex; France, vol. Ran WG2, no. Seoul, Korea; May 19, 2014-May 23, 2014, Jun. 6, 2014 (Jun. 6, 2014), 63 Pages, XP050819210, Retrieved from the Internet: URL: http://www.3gpp.org/ftp/tsg_ran/WG2_RL2/TSGR2_86/Docs/ [retrieved on Jun. 6, 2014] chapters 4.X.1, 7.X, 10, 10.1.2, 10.1.2.X, 10.1.3, L.5.

Broadcom Corporation: "Measurement report triggering for Dual Connectivity", 3GPP TSG-RAN WG2 Meeting #85bis, R2-141284, Valencia, Spain, Mar. 31-Apr. 4, 2014, 3 Pages.

Intel Corporation: "System information provisioning for SCG", 3GPP TSG RAN WG2 Meeting #86, R2-142042, Seoul, South Korea, May 19-23, 2014, pp. 1-3.

* cited by examiner

TECHNIQUES FOR REPORTING TIMING DIFFERENCES IN MULTIPLE CONNECTIVITY WIRELESS COMMUNICATIONS

CLAIM OF PRIORITY UNDER 35 U.S.C. § 119

The present Application for Patent is a continuation of application Ser. No. 14/742,442 entitled "TECHNIQUES FOR REPORTING TIMING DIFFERENCES MULTIPLE CONNECTIVITY WIRELESS COMMUNICATIONS" filed Jun. 17, 2015, which claims priority to Provisional Application No. 62/023,717 entitled "TECHNIQUES FOR REPORTING TIMING DIFFERENCES BETWEEN MULTIPLE CELLS OR CELL GROUPS IN MULTIPLE CONNECTIVITY WIRELESS COMMUNICATIONS" filed Jul. 11, 2014, which are assigned to the assignee hereof and hereby expressly incorporated in its entirety by reference herein.

FIELD OF THE DISCLOSURE

The present disclosure, for example, relates to wireless communication systems, and more particularly to techniques for reporting timing differences in multiple connectivity wireless communications.

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

In multiple connectivity, the UE can be configured to communicate with multiple cells or cell groups configured by multiple base stations using multiple links. In this configuration, the multiple cells or cell groups may not be synchronized in time, which may result in failure of certain procedures that may benefit from timing alignment among the cells or cell groups. Such procedures may include defining measurement gaps during which a UE can tune away from the multiple cells or cell groups to measure cells of other frequencies or radio access technologies, discontinuous receive (DRX) mode operations where the UE receiver is active only during certain durations to lower power consumption, etc. If the multiple cell or cell groups are not time aligned for such procedures, however, the UE transceiver may miss signals from one cell or cell group during a measurement gap defined by another cell or cell group or in an idle period for a DRX mode defined by another cell or cell group.

SUMMARY OF THE DISCLOSURE

Aspects of the present disclosure relate generally to wireless communications, and more particularly, to techniques for determining and reporting timing differences between multiple cells or cell groups in multiple connectivity wireless communications. For example, techniques for reporting timing differences when communicating with multiple cells configured by multiple base stations are described herein.

In accordance with an aspect, a method for reporting difference in timing between cells using multiple connectivity in a wireless network is provided. The method includes establishing a first connection served by at least a first cell, and establishing a second connection served by at least a second cell. The method also includes receiving a reporting configuration specifying one or more parameters related to reporting a timing difference between cells, determining a timing difference between at least the first cell and at least the second cell, and reporting the timing difference to at least the first cell over the first connection or to at least the second cell over the second connection based at least in part on the reporting configuration.

The method may also include wherein the first connection is with a master cell group comprising at least the first cell, and the second connection is with a secondary cell group comprising at least the second cell. The method may further include wherein receiving the reporting configuration comprising receiving the reporting configuration from at least the first cell or at least the second cell. Additionally, the method may include wherein reporting the timing difference is based at least in part on detecting expiration of a periodic timer, wherein the one or more parameters relate to the periodic timer. Further, the method may include wherein reporting the timing difference is based at least in part on determining that the timing difference differs from an assumed timing difference by at least a threshold, wherein the one or more parameters relate to the assumed timing difference or the threshold. The method may also include wherein reporting the timing difference is based at least in part on determining that the timing difference differs from a previously reported timing difference by at least a threshold, wherein the one or more parameters relate to the threshold.

The method may also include wherein reporting the timing difference is based at least in part on determining that the timing difference corresponds to an offset in subframe alignment that is outside of a range corresponding to a possible timing accuracy where a previously reported timing difference corresponded to a previous offset in subframe alignment that was inside of the range corresponding to the possible timing accuracy. Further, the method may include wherein reporting the timing difference is based at least in part on determining that the timing difference corresponds to an offset in subframe alignment that is inside of a range corresponding to a possible timing accuracy where a previously reported timing difference corresponded to a previous offset in subframe alignment that was outside of the range corresponding to the possible timing accuracy. Additionally, the method may include wherein reporting the timing difference is based at least in part on detecting expiration of a prohibit timer. The method may also include configuring one or more parameters for communicating over the first connection or the second connection based at least in part on the timing difference. Additionally, the method may include wherein the one or more parameters correspond to measurement gaps defined for the first connection or the second connection. Furthermore, the method may include receiving a connection reconfiguration message to configure the second connection served by at least the second cell, wherein reporting the timing difference is based at least in part on receiving the reporting configuration, and wherein establishing the second connection includes configuring the second connection based at least in part on receiving the connection reconfiguration message and reporting the timing difference.

In another example, an apparatus for reporting difference in timing between cells using multiple connectivity in a wireless network is provided. The apparatus includes a communicating component configured to establish a first connection served by at least a first cell and establish a second connection served by at least a second cell to facilitate communicating with at least the first cell and at least the second cell. The apparatus also includes a timing difference triggering component configured to receive a reporting configuration specifying one or more parameters related to reporting a timing difference between cells, a timing difference determining component configured to determine a timing difference between at least the first cell and at least the second cell, and a timing difference reporting component configured to report the timing difference to at least the first cell over the first connection or to at least the second cell over the second connection based at least in part on the reporting configuration.

In addition, the apparatus may include wherein the first connection is with a master cell group comprising at least the first cell, and the second connection is with a secondary cell group comprising at least the second cell. The apparatus may also include wherein the timing difference triggering component is configured to receive the reporting configuration from at least the first cell or at least the second cell. Moreover, the apparatus may include wherein the timing difference reporting component is configured to report the timing difference based at least in part on the timing difference triggering component detecting expiration of a periodic timer, wherein the one or more parameters relate to the periodic timer. The apparatus may also include wherein the timing difference reporting component is configured to report the timing difference based at least in part on the timing difference triggering component determining that the timing difference differs from an assumed timing difference by at least a threshold, wherein the one or more parameters relate to the assumed timing difference or the threshold. In addition, the apparatus may include wherein the timing difference reporting component is configured to report the timing difference based at least in part on the timing difference triggering component determining that the timing difference differs from a previously reported timing difference by at least a threshold, wherein the one or more parameters relate to the threshold.

Additionally, the apparatus may include wherein the timing difference reporting component is configured to report the timing difference based at least in part on the timing difference triggering component determining that the timing difference corresponds to an offset in subframe alignment that is outside of a range corresponding to a possible timing accuracy where a previously reported timing difference corresponded to a previous offset in subframe alignment that was inside of the range corresponding to the possible timing accuracy. The apparatus may also include wherein the timing difference reporting component is configured to report the timing difference based at least in part on the timing difference triggering component determining that the timing difference corresponds to an offset in subframe alignment that is inside of a range corresponding to a possible timing accuracy where a previously reported timing difference corresponded to a previous offset in subframe alignment that was outside of the range corresponding to the possible timing accuracy. Further, the apparatus may include wherein the timing difference reporting component is configured to report the timing difference based at least in part on the timing difference triggering component detecting expiration of the prohibit timer. The apparatus may also include wherein the communicating component is further configured to configure one or more parameters for communicating over the first connection or the second connection based at least in part on the timing difference. Additionally, the apparatus may include wherein the one or more parameters correspond to measurement gaps defined for the first connection or the second connection. The apparatus may further include a connection configuring component configured to receive a connection reconfiguration message to configure the second connection served by at least the second cell, wherein the timing difference reporting component is configured to report the timing difference based at least in part on receiving the reporting configuration, and wherein the communicating component is configured to establish the second connection at least in part by configuring the second connection based at least in part on receiving the connection reconfiguration message and reporting the timing difference.

In another example, an apparatus for reporting difference in timing between cells using multiple connectivity in a wireless network is provided. The apparatus includes means for establishing a first connection served by at least a first cell, and means for establishing a second connection served by at least a second cell to facilitate communicating with at least the first cell and at least the second cell. The apparatus also includes means for receiving a reporting configuration specifying one or more parameters related to reporting a timing difference between cells, means for determining a timing difference between at least the first cell and at least the second cell, and means for reporting the timing difference to at least the first cell over the first connection or to at least the second cell over the second connection based at least in part on the reporting configuration.

The apparatus can also include wherein the first connection is with a master cell group comprising at least the first cell, and the second connection is with a secondary cell group comprising at least the second cell. The apparatus may further include wherein the means for receiving receives the reporting configuration from at least the first cell or at least the second cell.

In another example, a computer-readable storage medium comprising computer-executable code for reporting difference in timing between cells using multiple connectivity in a wireless network is provided. The code includes code for establishing a first connection served by at least a first cell, and code for establishing a second connection served by at least a second cell to facilitate communicating with at least the first cell and at least the second cell. The code further includes code for receiving a reporting configuration specifying one or more parameters related to reporting a timing difference between cells, code for determining a timing difference between at least the first cell and at least the second cell, and code for reporting the timing difference to at least the first cell over the first connection or to at least the second cell over the second connection based at least in part on the reporting configuration.

The computer-readable storage medium may also include wherein the first connection is with a master cell group comprising at least the first cell, and the second connection is with a secondary cell group comprising at least the second cell. The computer-readable storage medium may further include wherein the code for receiving receives the reporting configuration from at least the first cell or at least the second cell.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
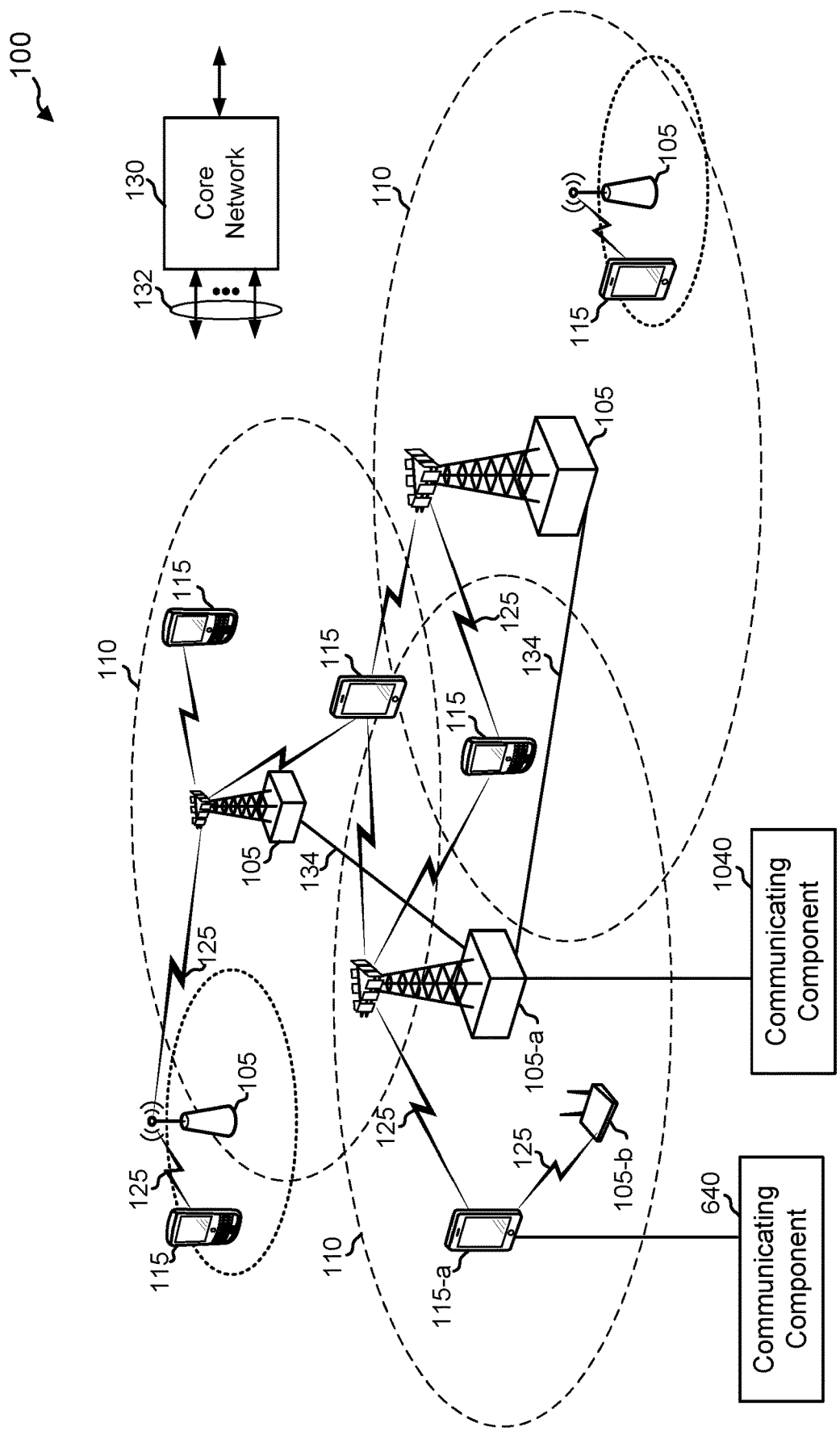
FIG. 1 is a block diagram conceptually illustrating an example of a wireless communications system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various techniques including methods, apparatuses, devices, and systems are described for determining and reporting timing difference between multiple cells or cell groups in a multiple connectivity wireless communication mode. In some aspects, a wireless device (e.g., user equipment (UE)) can communicate with the multiple cells configured by one or more network entities using multiple connectivity wireless communication modes, which may include receiving granted resources from each of the multiple cells, over which the wireless device can communicate in accessing a wireless network. In some aspects, a wireless device may receive first configuration information to communicate with a first primary cell (e.g., a master cell group (MCG)/primary cell group (PCG) primary cell, also referred to herein as a $PCell_{MCG}$) of a first network entity. The wireless device may also receive second configuration information to communicate with a second primary cell (e.g., a secondary cell group (SCG) primary cell, also referred to herein as a $PCell_{SCG}$) of a second network entity. In the case of multiple connectivity, the PCells may be configured by different eNodeBs (e.g., a master eNodeB/primary eNodeB, also referred to herein as an MeNodeB, that provides the PCell, and a secondary eNodeB, also referred to herein as an SeNodeB, that provides the $PCell_{SCG}$). The PCells may be configured to operate respective cell groups (e.g., MCG and/or SCG), which may include one or more cells (e.g., the PCell and one or more SCells). For example, one or more cells in a cell group may operate in a different frequency band and/or may include one or more component carriers (CCs). It is to be appreciated that the first network entity may be non-collocated with the second network entity or collocated with the first network entity in some examples.

In either case, each of the first primary cell and the second primary cell (or respective cell groups) may not be synchronized in time with one another. Thus, the UE can report a timing difference and/or related information to one or more of the first primary cell, second primary cell (or respective cell groups), or other network entities to facilitate performing certain operations that may benefit from timing alignment among the cells or cell groups, such as determining measurement gaps, communicating using a discontinuous receive (DRX) mode, etc. The UE may report the timing difference based on a reporting configuration. A reporting configuration may refer to a configuration stored by the UE, which may be received from one or more network entities (e.g., one or more eNodeBs) or otherwise provisioned to the UE. The reporting configuration can specify one or more parameters related to conditions for triggering timing difference determination among the cells or cell groups and/or reporting of the timing difference. Thus, as described further herein, the reporting configuration can indicate a type of a trigger for determining and/or reporting the timing difference (e.g., a periodic timer, a comparison between timing differences, a determination of subframes affected by the timing difference, a prohibit timer, etc.), one or more parameters related to the trigger (e.g., timer values, thresholds for comparing differences, etc.), and/or the like. In some examples, the UE may also suspend such operations until the timing difference is reported, in some examples, to ensure that proper alignment may be achieved among the cells or cell groups based on the timing difference.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with various aspects of the present disclosure. The wireless communications system 100 includes eNodeBs (or cells) 105, user equipment (UEs) 115, and a core network 130. The eNodeBs 105 may communicate with the UEs 115 under the control of a base station controller (not shown), which may be part of the core network 130 or the eNodeBs 105 in various embodiments. One or more UEs 115 can include a communicating component 640 for determining and/or reporting timing differences among various eNodeBs 105 serving the UE 115 in multiple connectivity. One or more eNodeBs 105 can include a communicating component 1040 for receiving reported timing differences from the UE 115 with other eNodeBs for determining scheduling of one or more operations for the UE 115. The eNodeBs 105 may communicate control information and/or user data with the core network 130 through first backhaul links 132. In embodiments, the eNodeBs 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The eNodeBs 105 may wirelessly communicate with the UEs 115 via one or more base station antennas. Each of the eNodeBs 105 sites may provide communication coverage for a respective geographic coverage area 110. In some embodiments, eNodeBs 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a eNodeB 105 may be divided into sectors making up only a portion of the coverage area (not shown). The wireless communications system 100 may include eNodeBs 105 of different types (e.g., macro, micro, and/or pico base stations). There may be overlapping coverage areas for different technologies.

In implementations, the wireless communications system 100 is an LTE/LTE-A network communication system. In LTE/LTE-A network communication systems, the terms evolved Node B (eNodeB) may be generally used to describe the eNodeBs 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell may cover a relatively large geographic area (e.g., several kilometers in radius) and may allow unrestricted access by UEs 115 with service subscriptions with the network provider. A pico cell may cover a relatively smaller geographic area (e.g., buildings) and may allow unrestricted access by UEs 115 with service subscriptions with the network provider. A femto cell may cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other eNodeBs 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) or multiple connectivity wireless communications with two or more cells provided by one or more eNodeBs 105. The eNodeBs 105 that are used for CA/multiple connectivity wireless communications may be collocated or may be connected through fast connections and/or non-collocated. In either case, coordinating the aggregation of component carriers (CCs) for wireless communications between the UE 115 and the eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects. For example, in carrier aggregation for dual connectivity (e.g., UE 115 connected to two non-collocated eNodeBs 105), the UE 115 may receive configuration information to communicate with a first eNodeB 105 (e.g., SeNodeB or SeNB) through a primary cell of the first eNodeB 105. The first eNodeB 105 may include a group of cells referred to as a secondary cell group or SCG, which includes one or more secondary cells and the primary cell or $PCell_{SCG}$ of the first eNodeB 105. The UE 115 may also receive configuration information to communicate with a second eNodeB 105 (e.g., MeNodeB or MeNB) through a second primary cell of the second eNodeB 105. The second eNodeB 105 may include a group of cells referred to as a master cell group or MCG, which includes one or more secondary cells and the primary cell or $PCell_{MCG}$ of the second eNodeB 105.

In certain aspects of the wireless communications system 100, carrier aggregation for dual connectivity may involve having a secondary eNodeB 105 (e.g., SeNodeB or SeNB) be configured to operate one of its cells as a $PCell_{SCG}$. The secondary eNodeB 105 may transmit, to a UE 115, configuration information through the $PCell_{SCG}$ for the UE 115 to communicate with the secondary eNodeB 105 while the UE 115 is in communication with a master eNodeB 105 (e.g., MeNodeB or MeNB). The master eNodeB 105 may transmit, to the same UE 115, configuration information via its PCell for that UE 115 to communicate with the other eNodeB 105. The two eNodeBs 105 may be non-collocated.

In examples described herein, UE 115 can be configured for determining a timing difference between the MCG and SCG and/or reporting the timing difference to one or more eNodeBs (e.g., eNodeBs 105) of the MCG, SCG, or other network entities, as described further herein. For example, the UE 115 can acquire system information from eNodeBs 105 of the MCG and/or SCG (e.g., one or more master information blocks (MIB)) from which timing of the eNodeB 105 or related cells or cell groups can be determined. Thus, the UE 115 can synchronize to one or more eNodeBs 105 of the MCG and one or more eNodeBs 105 of the SCG based on the system information, and can determine a timing difference between the MCG and SCG based on the timing used to synchronize with the eNodeBs 105. Accordingly, the UE 115 can report the determined timing difference to the network (e.g., via MCG and/or SCG or related eNodeBs 105), and the timing difference may be used to align resources for certain operations (e.g., measurement gaps, DRX-on duration during which resources for receiving communications are to be turned on, etc.). Without such alignment, the SCG may separately schedule the UE 115 for the operations inconsistently with the eNodeBs 105, which may result in an unnecessary utilization of resources for the operations.

For example, eNodeBs 105 of the MCG and SCG may not be aligned in timing, which can result in the MCG and SCG having different subframes (e.g. in different system frame numbers (SFN) or otherwise) positioned at similar times and/or having a different alignment of subframe boundaries. Accordingly, certain configurations that assume timing alignment, such as measurement gaps, DRX-on durations, etc., may not perform as desired unless the timing difference is provided to at least one of the eNodeBs 105 in at least one of the cell groups that schedules the UE 115 for such operations. Thus, for example UE 115 can determine and report the timing difference, and at least one of the eNodeBs 105 can use the reported timing difference in aligning resources assigned for the configurations with the other eNodeB 105, which can include aligning subframes for the configurations, aligning timing of the eNodeB such to use the same SFN or align subframes such that system frames begin at the same time as the other eNodeB 105, and/or the like. It is to be appreciated that the where the subframe boundaries are not aligned and/or where the timing difference measured and reported by the UE 115 may include some degree of inaccuracy, the eNodeB 105 aligning timing can determine a number of additional subframes to schedule in aligning the timing for the certain configurations based on the misalignment of subframe boundaries and/or potential inaccuracy of the received report, as described further herein.

Moreover, the UE 115 can determine to measure and/or report timing difference between the eNodeBs based on one or more triggers, such as a periodic time trigger, a measured difference in timing beyond an assumed timing or beyond a previously reported timing difference exceeding a threshold, a determination of certain subframes being impacted by a timing change, an expiration of a prohibit timer prohibiting measuring and reporting timing difference, etc. In addition, in one example, where the UE 115 initiates communications with a first eNodeB 105, the UE 115 can delay establishing communications with a second eNodeB 105 until a timing difference between the first and second eNodeBs is reported, until a confirmation of receiving the report or otherwise that the communications with the second eNodeB 105 can be established is received, etc.

Figure 2:
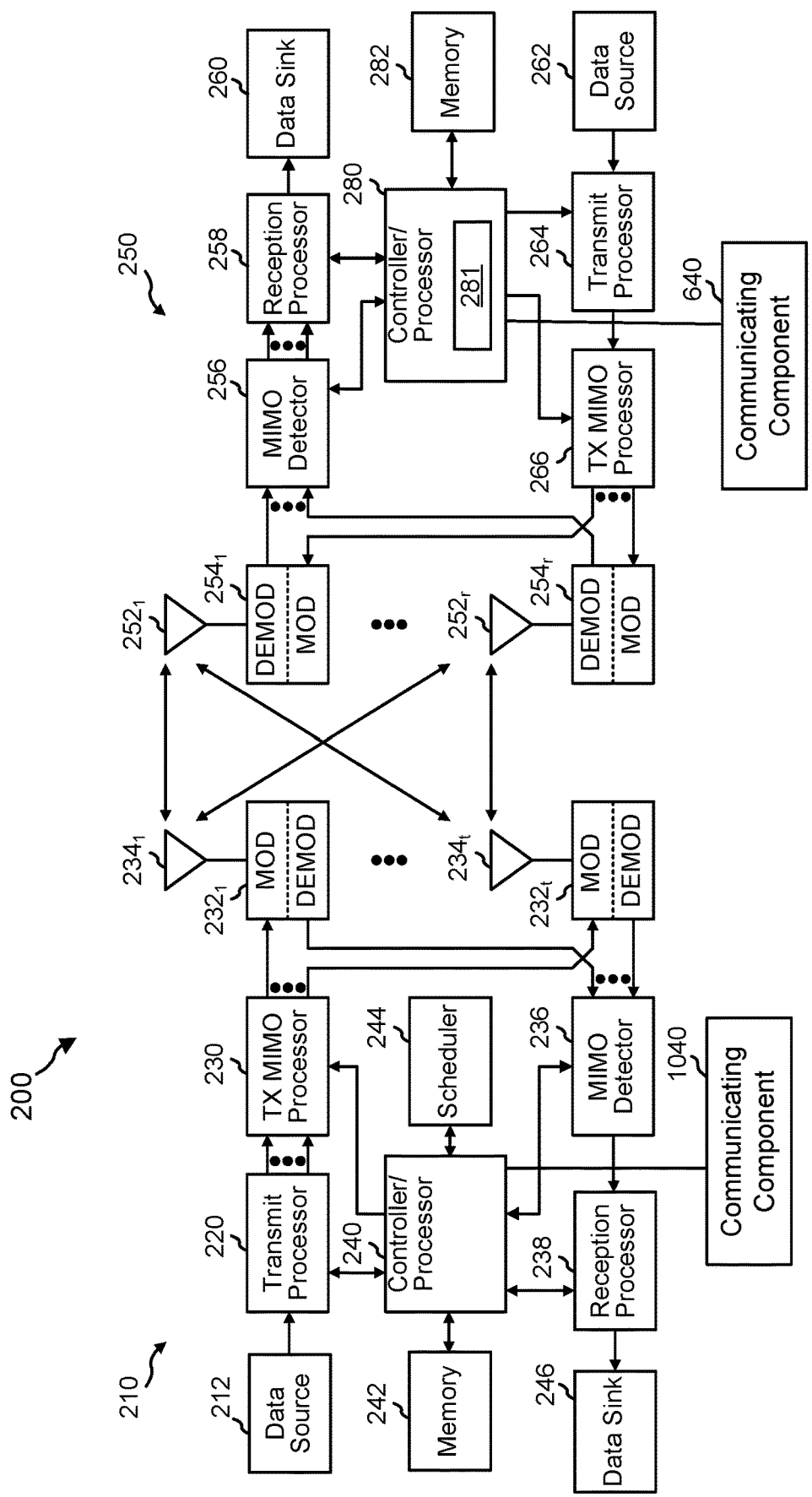
FIG. 2 is a block diagram conceptually illustrating examples of an eNodeB and a UE configured in accordance with various aspects of the present disclosure.

FIG. 2 is a block diagram conceptually illustrating examples of an eNodeB 210 and a UE 250 configured in accordance with an aspect of the present disclosure. For example, the eNodeB 210 and the UE 250 of a system 200, as shown in FIG. 2, may be one of the eNodeBs and one of the UEs in FIG. 1, respectively. Thus, for example, UE 250 can include a communicating component 640 for determining and/or reporting timing differences among various eNodeBs 210 serving the UE 250 in multiple connectivity. The eNodeB 210 can include a communicating component 1040 for receiving reported timing differences from the UE 250 with other eNodeBs for determining scheduling of one or more operations for the UE 250. In some aspects, the eNodeB 210 may support multiple connectivity (e.g., dual connectivity), carrier aggregation, etc. The eNodeB 210 may be an MeNodeB having one of the cells in its MCG configured as a $PCell_{MCG}$ or an SeNodeB having one of its cells in its SCG configured as a $PCell_{SCG}$. In some aspects, the UE 250 may also support multiple connectivity carrier aggregation. The UE 250 may receive configuration information from the eNodeB 210 via the $PCell_{MCG}$ and/or the $PCell_{SCG}$. The eNodeB 210 may be equipped with antennas $234_{1-t}$, and the UE 250 may be equipped with antennas $252_{1-r}$, wherein t and r are integers greater than or equal to one.

At the eNodeB 210, a eNodeB transmit processor 220 may receive data from a eNodeB data source 212 and control information from a eNodeB controller/processor 240. The control information may be carried on the PBCH, PCFICH, physical hybrid automatic repeat/request (HARD) indicator channel (PHICH), PDCCH, etc. The data may be carried on the PDSCH, etc. The eNodeB transmit processor 220 may process (e.g., encode and symbol map) the data and control information to obtain data symbols and control symbols, respectively. The eNodeB transmit processor 220 may also generate reference symbols, e.g., for the PSS, SSS, and cell-specific reference signal (RS). A eNodeB transmit (TX) multiple-input multiple-output (MIMO) processor 230 may perform spatial processing (e.g., precoding) on the data symbols, the control symbols, and/or the reference symbols, if applicable, and may provide output symbol streams to the eNodeB modulators/demodulators (MODs/DEMODs) $232_{1-t}$. Each eNodeB modulator/demodulator 232 may process a respective output symbol stream (e.g., for OFDM, etc.) to obtain an output sample stream. Each eNodeB modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the eNodeB 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators $254_{1-r}$, (e.g., for SC-FDM, etc.), and transmitted to the eNodeB 210. At the eNodeB 210, the uplink signals from the UE 250 may be received by the eNodeB antennas 234, processed by the eNodeB modulators/demodulators 232, detected by a eNodeB MIMO detector 236 if applicable, and further processed by a eNodeB reception processor 238 to obtain decoded data and control information sent by the UE 250. The eNodeB reception processor 238 may provide the decoded data to a eNodeB data sink 246 and the decoded control information to the eNodeB controller/processor 240.

The eNodeB controller/processor 240 and the UE controller/processor 280 may direct the operation at the eNodeB 210 and the UE 250, respectively. The UE controller/processor 280 and/or other processors and modules at the UE 250 may also perform or direct, e.g., the execution of the functional blocks illustrated in FIG. 6 and/or FIG. 10, and/or other processes for the techniques described herein (e.g., flowcharts illustrated in FIGS. 8, 9, 11, 12, etc.). In some aspects, at least a portion of the execution of these functional blocks and/or processes may be performed by block 281 in the UE controller/processor 280. The eNodeB memory 242 and the UE memory 282 may store data and program codes for the eNodeB 210 and the UE 250, respectively. For example, the UE memory 282 may store configuration information for multiple connectivity provided by the eNodeB 210 and/or another eNodeB. A scheduler 244 may be used to schedule UE 250 for data transmission on the downlink and/or uplink.

In one configuration, the UE 250 may include means for establishing a first connection served by at least a first cell. The UE 250 may also include means for establishing a second connection served by at least a second cell to facilitate communicating with at least the first cell and at least the second cell. The UE 250 may further include means for determining a timing difference between at least the first cell and at least the second cell. The UE 250 can also include means for reporting the timing difference to at least the first cell over the first connection or to at least the second cell over the second connection. In another configuration, the UE 250 can additionally or alternatively includes means for receiving a configuration message to establish a second connection served by at least a second cell, means for estimating a timing difference between at least the first cell and at least the second cell, means for reporting the timing difference to at least the first cell over the first connection, and means for configuring the second connection served by at least the second cell based at least in part on reporting the timing difference to at least the first cell. In one aspect, the aforementioned means may be the UE controller/processor 280, the UE memory 282, the UE reception processor 258, the UE MIMO detector 256, the UE modulators/demodulators 254, and the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 6 and/or FIG. 10.

Figure 3:
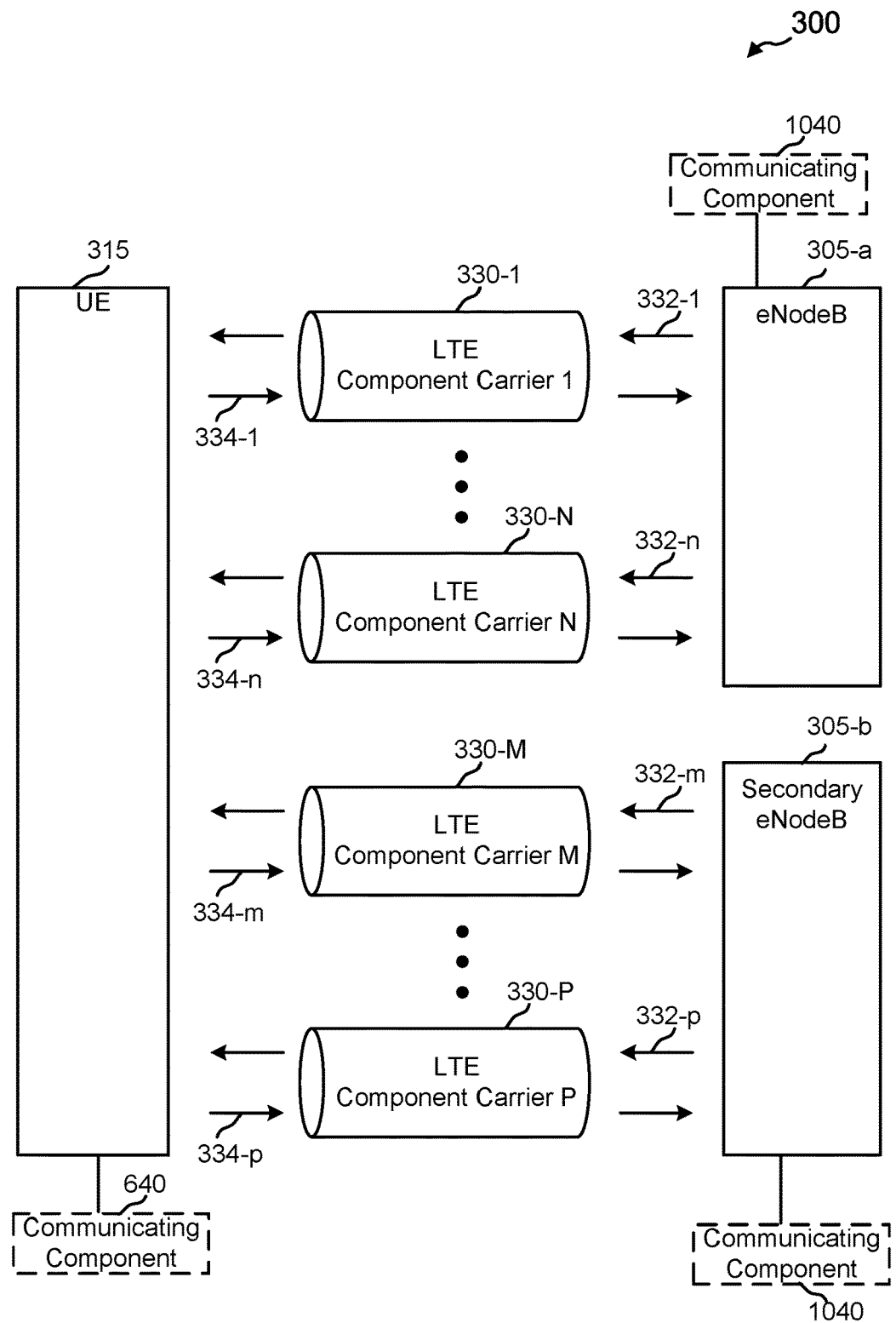
FIG. 3 is a block diagram conceptually illustrating an aggregation of radio access technologies at a UE, in accordance with various aspects of the present disclosure.

FIG. 3 is a block diagram conceptually illustrating an aggregation of carriers and/or connections at a UE, in accordance with an aspect of the present disclosure. The aggregation may occur in a system 300 including a multimode UE 315, which can communicate with an eNodeB 305-a using one or more component carriers 1 through N (CC$_1$-CC$_N$), and/or with a secondary eNodeB 305-b using one or more component carriers M through P (CC$_M$-CC$_P$). For example, the eNodeB 305-a and/or secondary eNodeB 305-b may include an AP, femto cell, pico cell, etc. UE 315 can include a communicating component 640 for determining and/or reporting timing differences among various eNodeBs 305-a, 305-b serving the UE 315 in multiple connectivity. The eNodeBs 305-a and/or 305-b can include a communicating component 1040 for receiving reported timing differences from the UE 315 with other eNodeBs for determining scheduling of one or more operations for the UE 315. UE 315 may be a multi-mode UE in this example that supports more than one radio access technology (RAT). For example, the UE 315 may support at least a WWAN radio access technology (e.g., LTE) and/or a WLAN radio access technology (e.g., Wi-Fi). A multi-mode UE may also support carrier aggregation and/or multiple connectivity carrier aggregation as described herein. The UE 315 may be an example of one of the UEs of FIG. 1, FIG. 2, FIG. 4, FIG. 5, FIG. 6, FIG. 10. The eNodeB 305-a and/or secondary eNodeB 305-b may be an example of one of the eNodeBs, base stations, network entities, etc. of FIG. 1, FIG. 2, FIG. 4, FIG. 5, FIG. 6, FIG. 10. While only one UE 315, one eNodeB 305-a, and one secondary eNodeB 305-b are illustrated in FIG. 3, it will be appreciated that the system 300 can include any number of UEs 315, eNodeBs 305-a, and/or secondary eNodeBs 305-b. In one specific example, UE 315 can communicate with one eNodeB 305-a over one or more LTE component carriers 330-1 to 330-N while communicating with another eNodeB 305-b over another one or more LTE component carriers 330-M to 330-P.

The eNodeB 305-a can transmit information to the UE 315 over forward (downlink) channels 332-1 through 332-N on LTE component carriers CC$_1$ through CC$_N$ 330. In addition, the UE 315 can transmit information to the eNodeB 305-a over reverse (uplink) channels 334-1 through 334-N on LTE component carriers CC$_1$ through CC$_N$. Similarly, the eNodeB 305-b may transmit information to the UE 315 over forward (downlink) channels 332-m through 332-p on LTE component carriers CC$_M$ through CC$_P$ 330. In addition, the UE 315 may transmit information to the eNodeB 305-b over reverse (uplink) channels 334-m through 334-p on LTE component carriers CC$_M$ through CC$_P$ 330.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

Figure 4:
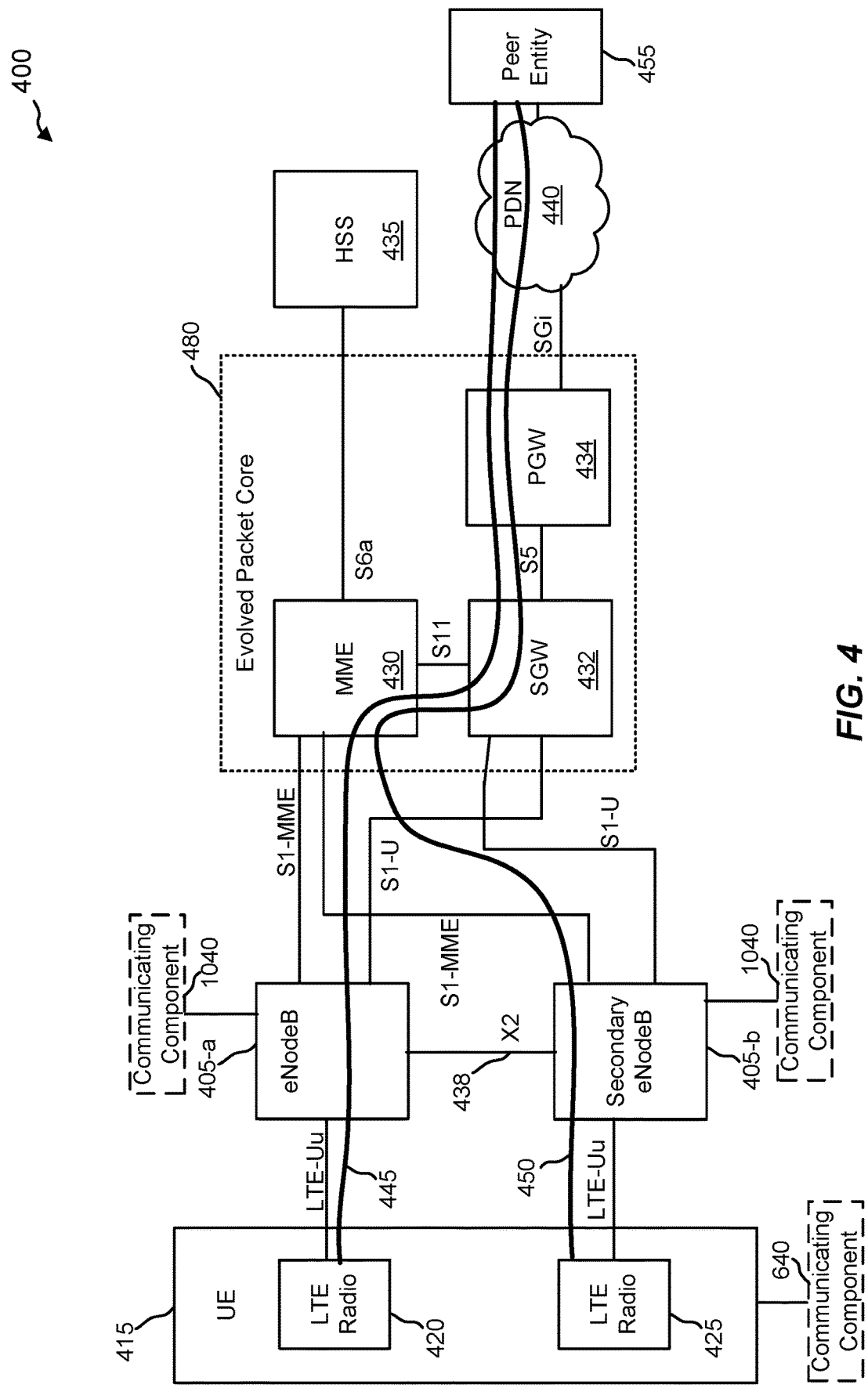
FIG. 4 is a block diagram conceptually illustrating an example of data paths between a UE and a PDN, in accordance with various aspects of the present disclosure.

In the present example, the UE 315 may receive data from one eNodeB 305-a. However, users on a cell edge may experience high inter-cell interference which may limit the data rates. Multiflow allows UEs to receive data from two eNodeBs 305-a and 305-b concurrently. In some aspects, the two eNodeBs 305-a may be non-collocated and may be configured to support multiple connectivity carrier aggregation. Multiflow works by sending and receiving data from the two eNodeBs 305-a/305-b in two totally separate streams when a UE is in range of two cell towers in two adjacent cells at the same time (see FIG. 5 below). The UE talks to two eNodeB 305-a/305-b simultaneously when the device is on the edge of either eNodeBs' reach. By scheduling two independent data streams to the mobile device from two different eNodeBs at the same time, multiflow exploits uneven loading in the wireless communication networks. This helps improve the cell edge user experience while increasing network capacity. In one example, throughput data speeds for users at a cell edge may double. In some aspects, multiflow may also refer to the ability of a UE to talk to a WWAN tower (e.g., cellular tower) and a WLAN tower (e.g., AP) simultaneously when the UE is within the reach of both towers. In such cases, the towers may be configured to support carrier aggregation through multiple connections when the towers are not collocated. FIG. 4 is a block diagram conceptually illustrating an example of data paths 445 and 450 between a UE 415 and a PDN 440 (e.g., Internet or one or more components to access the Internet) in accordance with an aspect of the present disclosure. The data paths 445, 450 are shown within the context of a wireless communications system 400 for aggregating data from different eNodeBs 405-a and 405-b, which may or may not use the same RAT. The system 200 of FIG. 2 may be an example of portions of the wireless communications system 400. The wireless communications system 400 may include a multi-mode UE 415, an eNodeB 405, a secondary eNodeB 405-b that can be coupled to the eNodeB 405-a via a backhaul link 438 (e.g., based on a X2 interface), an evolved packet core (EPC) 480, a PDN 440, and a peer entity 455. UE 415 can include a communicating component 640 for determining and/or reporting timing differences among various eNodeBs 405-a, 405-b serving the UE 415 in multiple connectivity. The eNodeBs 405-a and/or 405-b can include a communicating component 1040 for receiving reported timing differences from the UE 415 with other eNodeBs for determining scheduling of one or more operations for the UE 415. The multi-mode UE 415 may be configured to support carrier aggregation, multiple connectivity (e.g., dual connectivity) carrier aggregation, and/or the like. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and an LTE radio 425. These elements may represent aspects of one or more of their counterparts described above with reference to the previous or subsequent Figures. For example, the UE 415 may be an example of UEs in FIG. 1, FIG. 2, FIG. 3, FIG. 5, FIG. 6, FIG. 10, the eNodeB 405-a may be an example of the eNodeBs/base stations/network entities of FIG. 1, FIG. 2, FIG. 3, FIG. 5, FIG. 6, FIG. 10, the secondary eNodeB 405-b may be an example of the secondary eNodeB/base stations/network entities of FIG. 1, FIG. 2, FIG. 3, FIG. 5, FIG. 6, FIG. 10, and/or the EPC 480 may be an example of the core network 130 of FIG. 1. The eNodeBs 405-a and 405-b in FIG. 4 may be not be collocated or otherwise may not be in high-speed communication with each other. In addition, in an example, eNodeBs 405 and 405-*b* may communicate with different EPCs 480.

Referring back to FIG. 4, the eNodeB 405-*a* and/or 405-*b* may be capable of providing the UE 415 with access to the PDN 440 using the aggregation of one or more LTE component carriers (e.g., with one or more eNodeBs). Accordingly, the UE 415 may involve carrier aggregation in dual connectivity, where one connection is to one network entity (eNodeB 405-*a*) and the other connection is to a different network entity (eNodeB 405-*b*). It is to be appreciated that UE 415 can communicate with additional eNodeBs 405-*a* and/or 405-*b* via additional data paths 445, 450 that traverse the EPC 408 or not to access PDN 440 to provide multiple connectivity wireless communications with multiple eNodeBs, carrier aggregation with multiple cells of an eNodeB, etc. Using this access to the PDN 440, the UE 415 may communicate with the peer entity 455. The eNodeB 405-*a* and/or 405-*b* may provide access to the PDN 440 through the EPC 480 (e.g., through data path 445 and/or 450). In the depicted example, the UE 415 can communicate with eNodeB 405 as a MeNodeB and the eNodeB 405-*b* as SeNodeB over eNodeB-specific bearers. In an example, eNodeBs 405-*a* and 405-*b* can communicate with one another over an X2 connection 438 to aggregate UE 415 communications for providing the EPC 480. In this example, UE 415 can access the PDN 440 by using the bearer with eNodeB 405 and/or secondary eNodeB 405-*b* (or related cells or cell groups), which can map communications over the data paths 445 and 450 to access the PDN 440.

The MME 430 may be the control node that processes the signaling between the UE 415 and the EPC 480. The MME 430 may provide bearer and connection management. The MME 430 may, therefore, be responsible for idle mode UE tracking and paging, bearer activation and deactivation, and SGW selection for the UE 415. The MME 430 may communicate with the eNodeBs 405-*a* and/or 405-*b* over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an Sha interface defined by the Evolved Packet System (EPS) architecture standardized by the 3GPP organization.

All user IP packets transmitted over LTE may be transferred through eNodeBs 405-*a* and/or 405-*b* to the SGW 432, which may be connected to the PDN gateway 434 over an S5 signaling interface and the MME 430 over an Sli signaling interface. The SGW 432 may reside in the user plane and act as a mobility anchor for inter-eNodeB handovers and handovers between different access technologies. The PDN gateway 434 may provide UE IP address allocation as well as other functions.

The PDN gateway 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over data path 445 of the LTE link or data path 450. Signaling or control plane data related to the set of one or more EPS bearers may be transmitted between the LTE radio 420 of the UE 415 and the MME 430 of the EPC 480, by way of the eNodeBs 405-*a* and/or 405-*b*.

While aspects of FIG. 4 have been described with respect to LTE, similar aspects regarding aggregation and/or multiple connections may also be implemented with respect to UMTS or other similar system or network wireless communications radio technologies.

Figure 5:
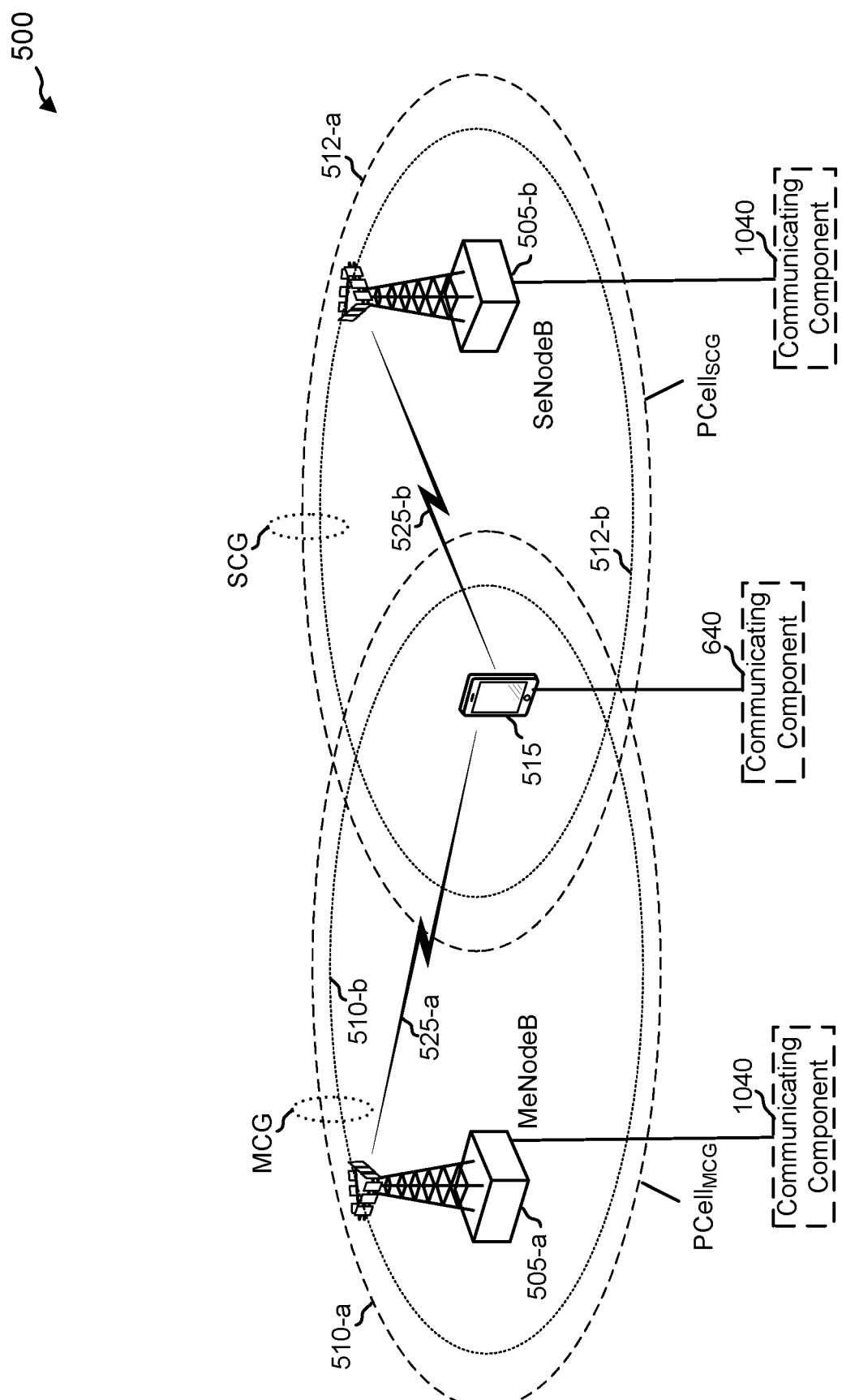
FIG. 5 is a diagram conceptually illustrating multiple connectivity carrier aggregation, in accordance with various aspects of the present disclosure.

FIG. 5 is a diagram conceptually illustrating multiple connectivity carrier aggregation, in accordance with an aspect of the present disclosure. A wireless communications system 500 may include a master eNodeB 505-*a* (MeNodeB or MeNB) having a set or group of cells referred to as a master cell group or MCG (or PCG) that may be configured to serve the UE 515. The MCG may include one primary cell ($PCell_{MCG}$) 510-*a* and one or more secondary cells 510-*b* (only one is shown). The wireless communications system 500 may also include a secondary eNodeB 505-*b* (SeNodeB or SeNB) having a set or group of cells referred to as a secondary cell group or SCG that may be configured to serve the UE 515. The SCG may include one primary cell ($PCell_{SCG}$) 512-*a* and one or more secondary cells 512-*b* (only one is shown). Also shown is a UE 515 that supports carrier aggregation for multiple connectivity (e.g., dual connectivity). The UE 515 may communicate with the MeNodeB 505-*a*, or a related $PCell_{MCG}$, via communication link 525-*a* and with the SeNodeB 505-*b*. or a related $PCell_{SCG}$, via communication link 525-*b*. UE 515 can include a communicating component 640 for determining and/or reporting timing differences among various eNodeBs 505-*a*, 505-*b* serving the UE 515 in multiple connectivity. The eNodeBs 505-*a* and/or 505-*b* can include a communicating component 1040 for receiving reported timing differences from the UE 515 with other eNodeBs for determining scheduling of one or more operations for the UE 515.

In an example, the UE 515 may aggregate component carriers from the same eNodeB or may aggregate component carriers from collocated or non-collocated eNodeBs. In such an example, the various cells (e.g., different component carriers (CCs)) being used can be easily coordinated because they are either handled by the same eNodeB or by eNodeBs that can communicate control information. When the UE 515, as in the example of FIG. 5, performs carrier aggregation when in communication with two eNodeBs that are non-collocated, then the carrier aggregation operation may be different due to various network conditions. In this case, establishing a primary cell ($PCell_{SCG}$) in the secondary eNodeB 505-*b* may allow for appropriate configurations and controls to take place at the UE 515 even though the secondary eNodeB 505-*b* is non-collocated with the primary eNodeB 505-*a*.

In the example of FIG. 5, the carrier aggregation may involve certain functionalities by the $PCell_{MCG}$ of the MeNodeB 505-*a*. For example, the $PCell_{MCG}$ may handle certain functionalities such as physical uplink control channel (PUCCH), contention-based random access control channel (RACH), and semi-persistent scheduling to name a few. Carrier aggregation with dual or multiple connectivity to non-collocated eNodeBs may involve having to make some enhancements and/or modifications to the manner in which carrier aggregation is otherwise performed. Some of the enhancements and/or modifications may involve having the UE 515 connected to the MeNodeB 505-*a* and to the SeNodeB 505-*b* as described above. Other features may include, for example, having a timer adjustment group (TAG) comprise cells of one of the eNodeBs, having contention-based and contention-free random access (RA) allowed on the SeNodeB 505-*b*, separate discontinuous reception (DRX) procedures for the MeNodeB 505-*a* and to the SeNodeB 505-*b*, having the UE 515 send a buffer status report (BSR) to the eNodeB where the one or more bearers (e.g., eNodeB specific or split bearers) are served, as well as enabling one or more of power headroom report (PHR), power control, semi-persistent scheduling (SPS), and logical channel prioritization in connection with the $PCell_{SCG}$ in the secondary eNodeB 505-*b*. The enhancements and/or modifications described above, and well as others provided in the disclosure, are intended for purposes of illustration and not of limitation.

For carrier aggregation in dual connectivity, different functionalities may be divided between the MeNodeB 505-*a* and the SeNodeB 505-*b*. For example, different functionalities may be statically divided between the MeNodeB 505-*a* and the SeNodeB 505-*b* or dynamically divided between the MeNodeB 505-*a* and the SeNodeB 505-*b* based on one or more network parameters. In an example, the MeNodeB 505-*a* may perform upper layer (e.g., above the media access control (MAC) layer) functionality via a $PCell_{MCG}$, such as but not limited to functionality with respect to initial configuration, security, system information, and/or radio link failure (RLF). As described in the example of FIG. 5, the $PCell_{MCG}$ may be configured as one of the cells of the MeNodeB 505-*a* that belong to the MCG. The $PCell_{MCG}$ may be configured to provide lower layer functionalities (e.g., MAC/PHY layer) within the MCG.

In an example, the SeNodeB 505-*b* may provide configuration information of lower layer functionalities (e.g., MAC/PHY layers) for the SCG. The configuration information may be provided by the $PCell_{SCG}$ as one or more radio resource control (RRC) messages, for example. The $PCell_{SCG}$ may be configured to have the lowest cell index (e.g., identifier or ID) among the cells in the SCG. For example, some of the functionalities performed by the SeNodeB 505-*b* via the $PCell_{SCG}$ may include carrying the PUCCH, configuring the cells in the SCG to follow the DRX configuration of the $PCell_{SCG}$, configure resources for contention-based and contention-free random access on the SeNodeB 505-*b*, carrying downlink (DL) grants having transmit power control (TPC) commands for PUCCH, estimating path loss based on $PCell_{SCG}$ for other cells in the SCG, providing common search space for the SCG, and providing SPS configuration information for the UE 515.

In some aspects, the $PCell_{MCG}$ may be configured to provide upper level functionalities to the UE 515 such as security, connection to a network, initial connection, and/or radio link failure, for example. The $PCell_{MCG}$ may be configured to carry physical uplink control channel (PUCCH) for cells in the MCG, to include the lowest cell index among the MCG, to enable the MCG cells to have the same discontinuous reception (DRX) configuration, to configure random access resources for one or both of contention-based and contention-free random access on the MeNodeB 505-*a*, to enable downlink grants to convey transmit power control (TPC) commands for PUCCH, to enable path loss estimation for cells in the MCG, to configure common search space for the MeNodeB 505-*a*, and/or to configure semi-persistent scheduling.

In some aspects, the $PCell_{SCG}$ may be configured to carry PUCCH for cells in the SCG, to include the lowest cell index among the SCG, to enable the SCG cells to have the same DRX configuration, to configure random access resources for one or both of contention-based and contention-free random access on the SeNodeB 505-*b*, to enable downlink grants to convey TPC commands for PUCCH, to enable path loss estimation for cells in the SCG, to configure common search space for the SeNodeB 505-*b*, and/or to configure semi-persistent scheduling.

Returning to the example of FIG. 5, the UE 515 may support parallel PUCCH and physical uplink shared channel (PUSCH) configurations for the MeNodeB 505-*a* and the SeNodeB 505-*b*. In some cases, the UE 515 may use a configuration (e.g., UE 515 based) that may be applicable to both carrier groups. These PUCCH/PUSCH configurations may be provided through RRC messages, for example.

The UE 515 may also support parallel configuration for simultaneous transmission of acknowledgement (ACK)/negative acknowledgement (NACK) and channel quality indicator (CQI) and for ACK/NACK/sounding reference signal (SRS) for the MeNodeB 505-*a* and the SeNodeB 505-*b*. In some cases, the UE 515 may use a configuration (e.g., UE based and/or MCG or SCG based) that may be applicable to both carrier groups. These configurations may be provided through RRC messages, for example.

Figure 6:
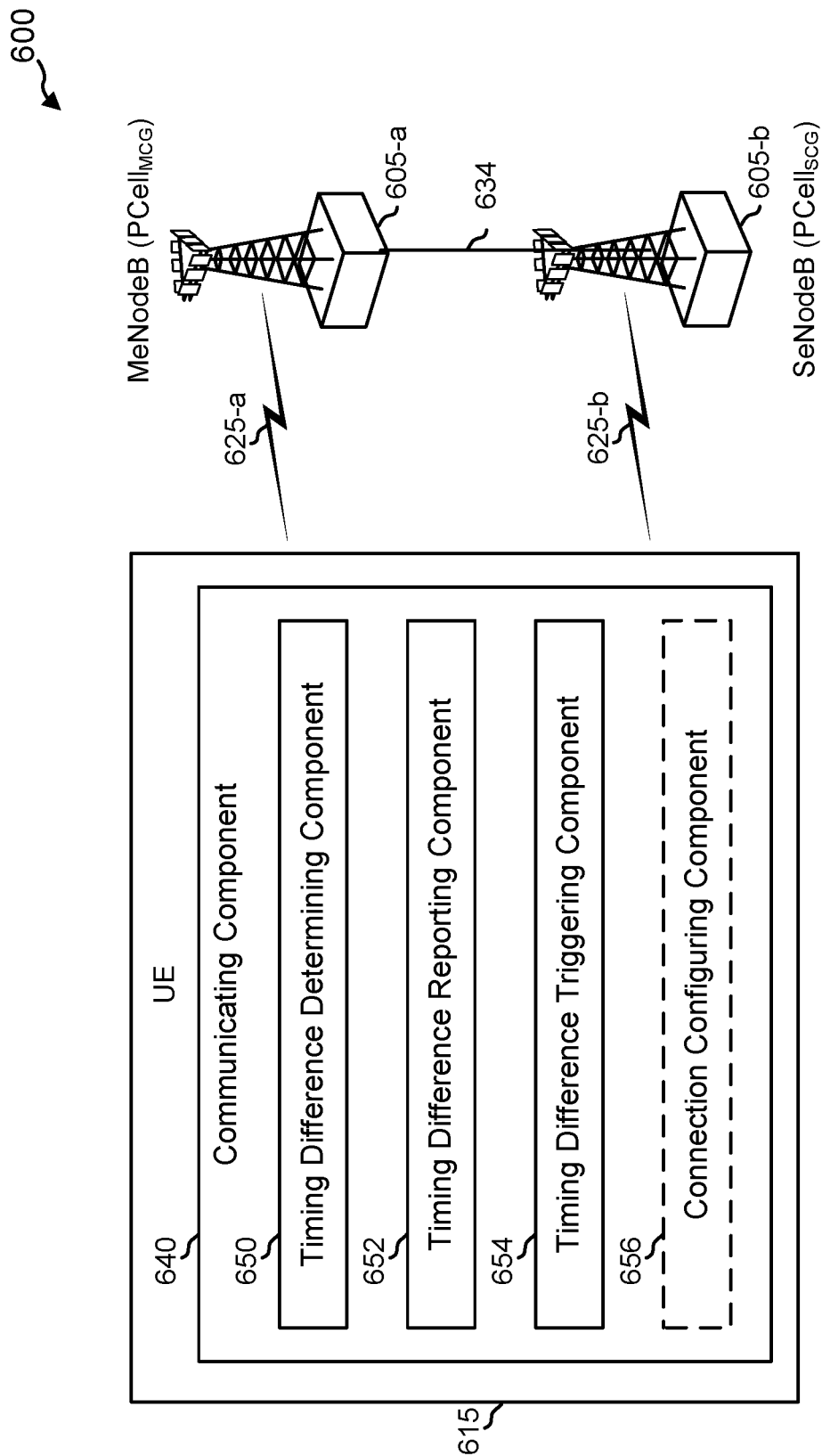
FIG. 6 is a block diagram conceptually illustrating an example of a UE and components configured in accordance with various aspects of the present disclosure.
Figure 8:
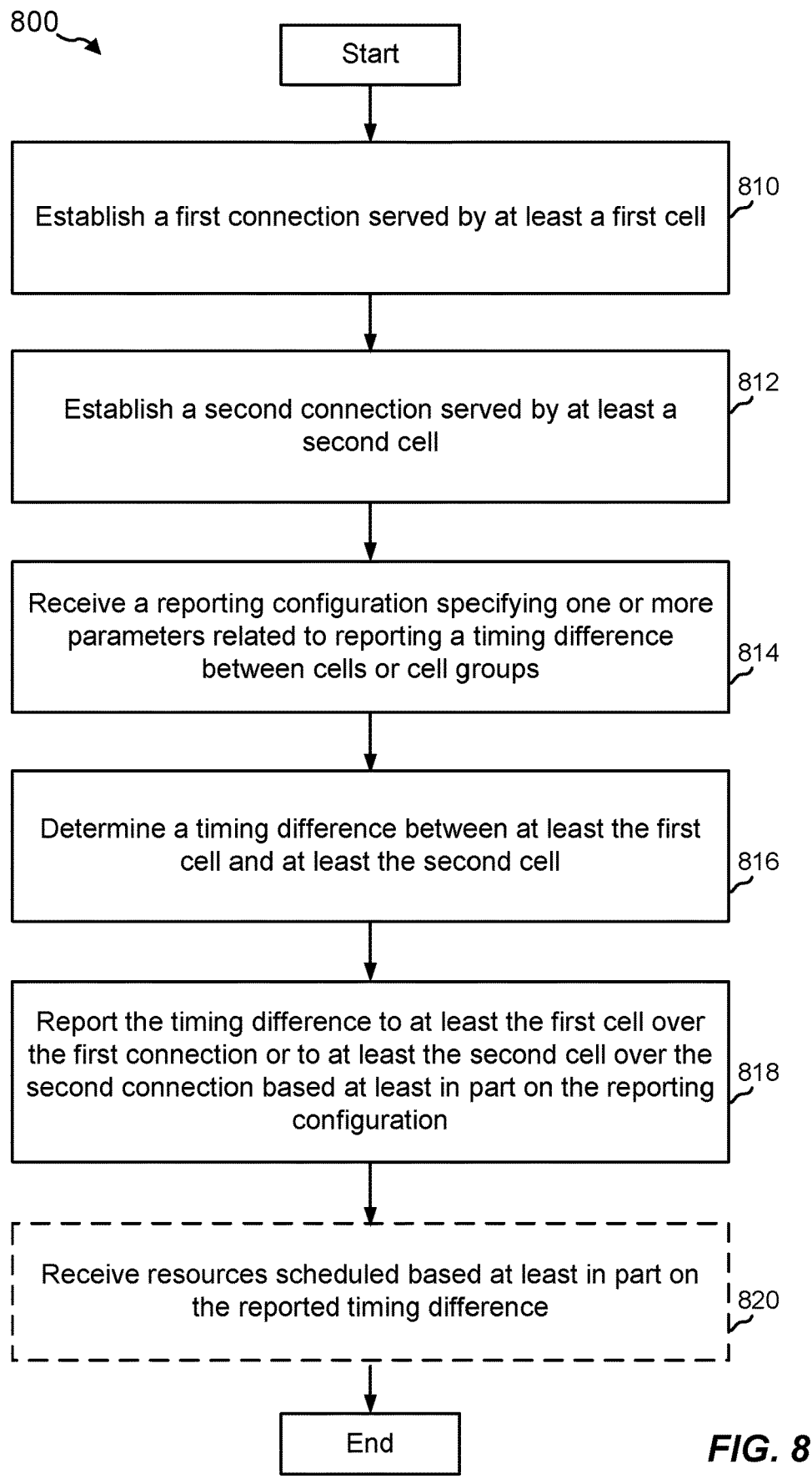
FIG. 8 is a flowchart illustrating a method for reporting timing difference, in accordance with various aspects of the present disclosure.
Figure 9:
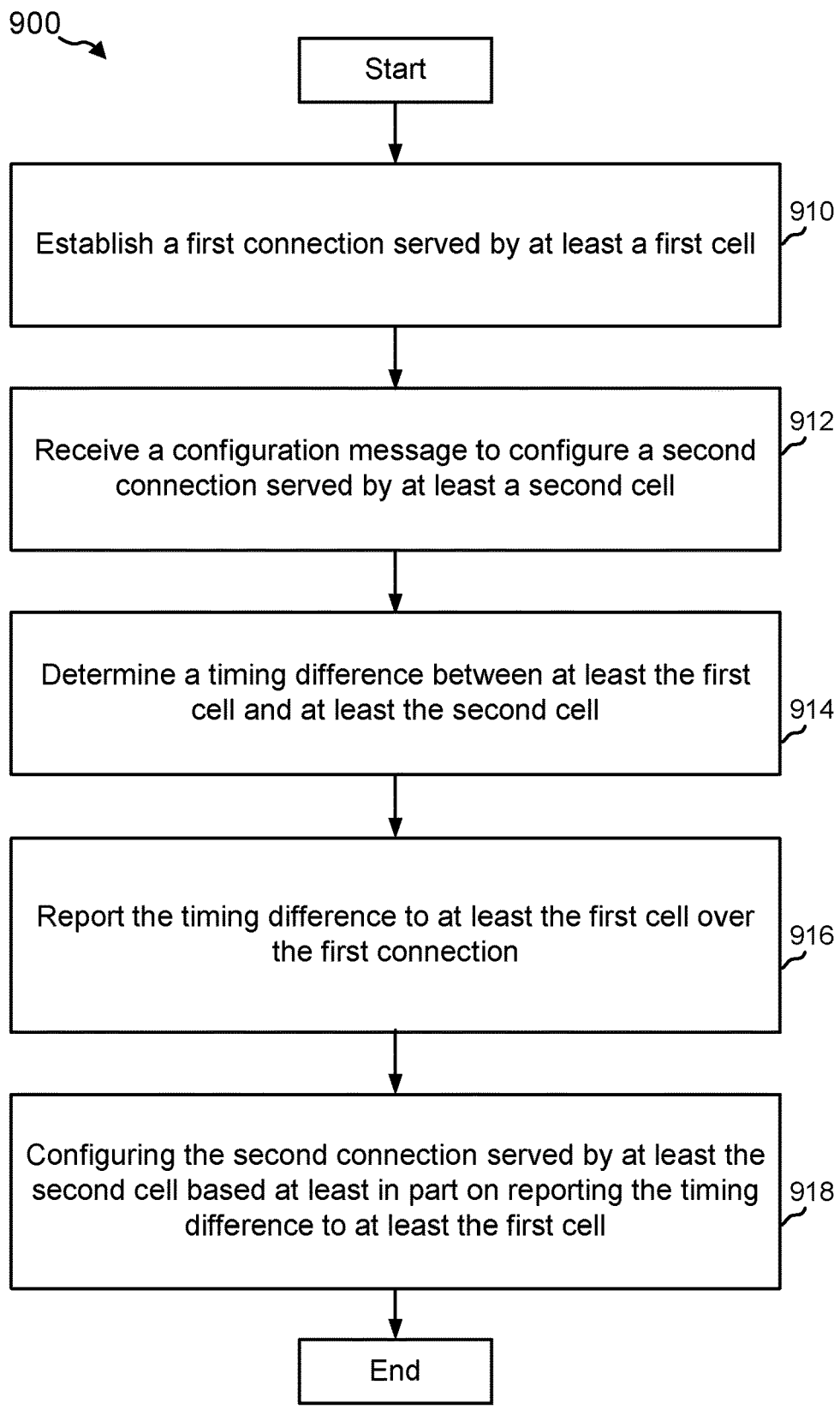
FIG. 9 is a flowchart illustrating a method for configuring a connection in a wireless network, in accordance with various aspects of the present disclosure.

FIG. 6 is a block diagram 600 conceptually illustrating an example of a UE 615 and components configured in accordance with an aspect of the present disclosure. FIGS. 8 and 9, which are described in conjunction with FIG. 6 herein, illustrate example methods 800 and 900 in accordance with aspects of the present disclosure. Although the operations described below in FIGS. 8 and 9 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 6, a eNodeB 605-*a* (MeNodeB of a $PCell_{MCG}$), a eNodeB 605-*b* (SeNodeB of a $PCell_{SCG}$), and the UE 615 of diagram 600 may be one of the base stations/eNodeBs (or APs) and UEs as described in various Figures. The MeNodeB 605-*a*, or a $PCell_{MCG}$ related thereto, and the UE 615 may communicate over communication link 625-*a*. The SeNodeB 605-*b*, or a $PCell_{SCG}$ related thereto, and the UE 615 may communicate over communication link 625-*b*. UE 615 may be configured to determine a report a timing difference between the cells configured by the MeNodeB 605-*a* and SeNodeB 605-*b* (e.g., over communication links 625-*a* and 625-*b*) to facilitate performing operations that may benefit from timing alignment of the cells configured by the MeNodeB 605-*a* and/or SeNodeB 605-*b*. MeNodeB 605-*a* and SeNodeB 605-*b* may communicate over a backhaul link 634 to facilitate aggregating carriers of the UE 615 in multiple connectivity wireless communications, as described. In addition, in aspects described herein, MeNodeB 605-*a* and SeNodeB 605-*b* may communicate reported timing difference information over the backhaul link 634 to facilitate scheduling the UE 615 for one or more operations for which synchronizing timing may be beneficial (e.g., configuring measurement gaps, DRX-on durations, etc.).

In this regard, UE 615 may include a communicating component 640 for determining and/or reporting a timing difference between communication links 625-*a* and 625-*b* with eNodeBs 605-*a* and 605-*b*. Communicating component 640 can include, or can be in communication with, a timing difference determining component 650 for determining a timing difference between the cells or cell groups that serve communication links 625-*a* and 625-*b*, a timing difference reporting component 652 for reporting the timing difference between the cells to one or more eNodeBs or other network entities, and a timing difference triggering component 654 for detecting one or more events that can cause determining and reporting timing difference. Communicating component 640 can optionally include, or be in communication with, a connection configuring component 656 for suspending or resuming configuration of one or more operations based on whether the timing difference is reported, an acknowledgement of receiving the difference is received, etc.

Figure 7:
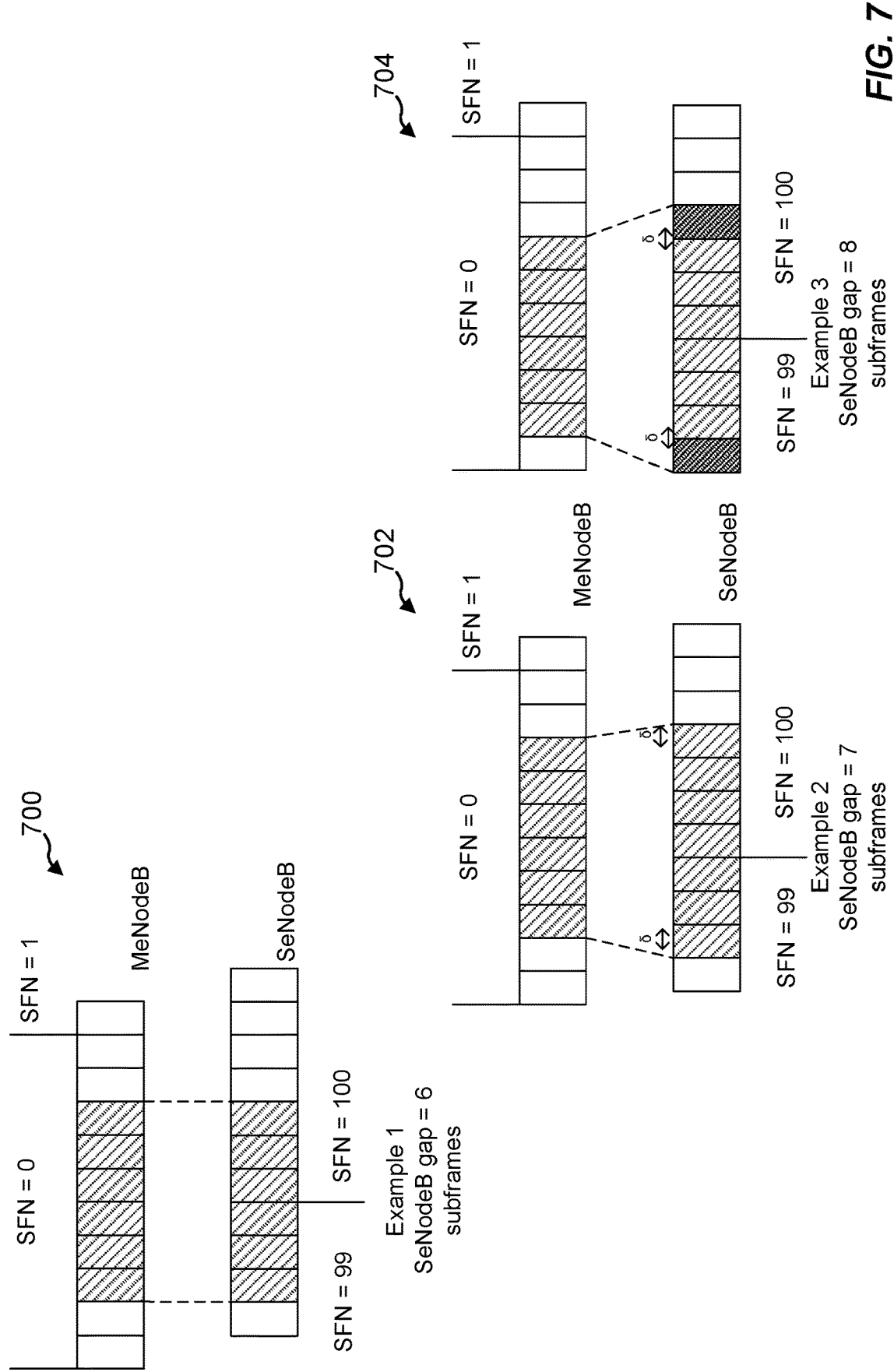
FIG. 7 illustrates example timing differences between network entities in a wireless network, in accordance with various aspects of the present disclosure.

FIG. 7 depicts example timing differences 700, 702, and 704 between cells configured by an MeNodeB and SeNodeB, and respective measurement gap determinations, in accordance with various aspects of the present disclosure. At timing difference 700, timing difference determining component 650 determines a timing difference between the MeNodeB 605-*a* and SeNodeB 605-*b* where the subframe boundaries are substantially aligned, but SFNs at a given time are different and/or position of the subframes within the system frame at a given time are different. In this example, timing difference reporting component 652 can report a timing difference between the MeNodeB 605-*a* and SeNodeB 605-*b* with high accuracy, and the timing difference can be considered based on the subframe alignment. In this example, subframes for measurement gaps can be selected for the cell configured by the SeNodeB 605-*b* and UE 615 as substantially aligned to the subframes selected for the cell configured by the MeNodeB 605-*a* and UE 615. In the depicted example, subframes 2-7 of SFN 0 (e.g., substantially aligned with subframes 7-9 of SFN 99 and subframes 0-2 of SFN 100) used by the cell provided by MeNodeB 605-*a* are selected as a measurement gap to allow UE 615 to measure cells of another RAT and/or frequency. In this regard, SeNodeB 605-*b* can schedule an aligned measurement gap based on measurement gaps defined for the MeNodeB 605-*a* and the reported timing difference (e.g., measurement gap subframe number at the MeNodeB 605-*a* plus at least a number of subframes indicated by or otherwise determined from the timing offset). In this example, the aligned measurement gap can be scheduled by SeNodeB 605-*b* to use the same number of subframes as the measurement gap scheduled by the MeNodeB 605-*a* since the subframes are aligned, and thus possible inaccuracies in determining the timing difference need not be considered. Moreover, though shown and described as applying to measurement gap, it is to be appreciated that subframes 2-7 of SFN 0 (or a less or greater number of subframes that may or may not span multiple SFNs) can be aligned by the SeNodeB 605-*b*, based on the subframes for the operation scheduled at MeNodeB 605-*a* and the reported timing difference, for additional operations, such as DRX on durations, and/or the like. This aligning of the measurement gap is referred to herein as "example 1."

In other examples, timing differences reported by the UE 615 may not be expected to have such high accuracy, and the timing differences of the MeNodeB 605-*a* and SeNodeB 605-*b* may be such that subframe boundaries are not aligned. At time difference 702, the subframe boundary offset between the timings of MeNodeB 605-*a* and SeNodeB 605-*b* may be outside of the possible timing estimate inaccuracy of the UE 615, denoted δ (e.g., δ<subframe boundary offset<subframe_length−δ). For example, the subframe boundary offset may be determined as the timing offset modulo the subframe_length (e.g., 1 ms in LTE). In this example, it can be determined which of MeNodeB 605-*a* and SeNodeB 605-*b* is ahead of the other in subframe timing based at least in part on whether the timing difference is >0.5*subframe_length (or some other threshold) or not. Thus, in this example, subframes can be aligned in the MeNodeB 605-*a* and SeNodeB 605-*b* such that subframes of the SeNodeB 605-*b* can be selected for the UE 615 which are substantially aligned to the subframes of the MeNodeB 605-*a* selected for the UE 615 for certain operations and also including an additional subframe before or after the aligned subframes. Determining whether to include the subframe before or after is based at least in part on determining whether SeNodeB timing is ahead of or behind the MeNodeB timing. In the depicted example, subframes 2-7 of SFN 0 at the MeNodeB 605-*a* are selected as a measurement gap to allow UE 615 to measure cells of another RAT and/or frequency. In this regard, SeNodeB 605-*b* can schedule subframes for an aligned measurement gap for the UE 615 based on the measurement gap defined by the MeNodeB 605-*a* and the reported timing difference. In this example, the aligned measurement gap can be scheduled by SeNodeB 605-*b* to use the same number of subframes as the measurement gap scheduled by the MeNodeB 605-*a* plus another subframe to account for timing inaccuracy, where the additional subframe is scheduled before the number of subframes (based on determining the SeNodeB 605-*b* to be ahead of the MeNodeB 605-*a* in subframe timing). Moreover, though shown and described as applying to measurement gap, it is to be appreciated that subframes 2-7 of SFN 0 (or a less or greater number of subframes that may or may not span multiple SFNs) can be aligned by the SeNodeB 605-*b* based, on the subframes for the operation scheduled at MeNodeB 605-*a* and the reported timing difference (and including the additional subframe before or after), for additional operations, such as DRX on durations, and/or the like. This aligning of the measurement gap is referred to herein as "example 2."

At time difference 704, the subframe boundary offset may be inside of the possible timing estimate inaccuracy (e.g., δ>=subframe boundary offset or subframe boundary offset>=subframe_length−δ). In this example, it may not be determined which of MeNodeB 605-*a* and SeNodeB 605-*b* is ahead of the other in subframe timing. Thus, in this example, subframes can be aligned in the MeNodeB 605-*a* and SeNodeB 605-*b* such that subframes can be selected at the SeNodeB 605-*b* for the UE 615 which are substantially aligned to the subframes selected for the MeNodeB 605-*a* to provide certain operations to the UE 615 and also including an additional subframe before and an additional subframe after the aligned subframes. In the depicted example, subframes 1-6 of SFN 0 at the MeNodeB 605-*a* are selected as a measurement gap to allow UE 615 to measure cells of another RAT and/or frequency. In this regard, an aligned measurement gap at the SeNodeB 605-*b* for the UE 615 can be determined based on measurement gap defined for the MeNodeB 605-*a* and the reported timing difference, and the SeNodeB 605-*b* can accordingly schedule the measurement gap for the UE 615 in the aligned measurement gap with an additional subframe scheduled before the aligned measurement gap and an additional subframe scheduled after the aligned measurement gap. Moreover, though shown and described as applying to measurement gap, it is to be appreciated that subframes 1-6 of SFN 0 (or a less or greater number of subframes that may or may not span multiple SFNs) can be aligned by the SeNodeB 605-*b* based, on the subframes for the operation scheduled at MeNodeB 605-*a* and the reported timing difference (and including the additional subframes before and after), for additional operations, such as DRX on durations, and/or the like. This aligning of the measurement gap is referred to herein as "example 3."

FIG. 8 illustrates an example method 800 for reporting timing difference between one or more cells or cell groups to one or more eNodeBs. Method 800 includes, at Block 810, establishing a first connection served by at least a first cell. Communicating component 640 (FIG. 6) can establish the first connection served by at least the first cell, which can include communication link 625-*a* with MeNodeB 605-*a* or a related cell or cell group (e.g., MCG) thereof. For example, this can include communicating component 640 performing one or more procedures to connect with the MeNodeB 605-*a* and/or one or more related cells thereof or in a related group of cells (e.g., performing a random access procedure with one or more cells). Method 800 also includes, at Block 812, establishing a second connection served by at least a second cell. Communicating component 640 can also establish the second connection served by at least the second cell, which can include communication link 625-*b* with SeNodeB 605-*b* or a related cell or cell group (e.g., SCG) thereof. For example, this can include communicating component 640 performing one or more procedures to connect with the SeNodeB 605-*b* and/or one or more related cells thereof or in a related group of cells (e.g., performing a random access procedure with one or more cells). As described previously, the connections can be configured using multiple connectivity to provide the UE 615 with communications concurrently configured in an MCG and SCG. MeNodeB 605-*a* and SeNodeB 605-*b*, however, may use different timings such that communication links 625-*a* and 625-*b* may use different subframe numbers for subframes configured in similar periods of time and/or such that the subframe boundaries of the communication links 625-*a* and 625-*b* are not aligned in time.

Method 800 includes, at Block 814, receiving a reporting configuration specifying one or more parameters related to reporting a timing difference between cells or cell groups. Timing difference triggering component 654 can receive the reporting configuration specifying the one or more parameters related to reporting the timing difference between cells or cell groups. For example, timing difference triggering component 654 can receive the reporting configuration from the first or second cell (e.g., the MeNodeB 605-*a*, SeNodeB 605-*b*, related cells or cell groups, etc.), from a stored or retrieved configuration at the UE 615, in a configuration received from other network entities (e.g., upon initiating connection in a wireless network), etc. For example, the one or more parameters in the reporting configuration can specify a type of trigger for the UE 615 to utilize in determining and/or reporting a timing difference between cells or cell groups, one or more parameters related to detecting a condition for determining and/or reporting the timing difference (e.g., one or more thresholds as described herein), etc. In this regard, for example, timing difference triggering component 654 may monitor the one or more parameters to detect the trigger or condition for determining the timing difference between the cells or cell groups and/or determining whether to report the determined timing difference.

For example, the trigger can relate to a periodic time trigger for detecting the condition for determining and reporting the timing difference after expiration of a period of time. Thus, for example, timing difference triggering component 654 may determine to initialize and maintain a timer, and/or may determine timer-related information (e.g., timer value), based on the one or more parameters in the reporting configuration, for determining and/or reporting the timing difference. In this example, timing difference triggering component 654 can initialize the timer after reporting a previous timing difference to MeNodeB 605-*a* and/or SeNodeB 605-*b*. For example, when the timer expires, timing difference determining component 650 can determine the timing difference and/or timing difference reporting component 652 can report the timing difference to MeNodeB 605-and/or SeNodeB 605-*b*, as described further herein. In an example, timing difference reporting component 652 can report the timing difference subject to additional conditions described herein or otherwise. Timing difference triggering component 654 may then restart the timer based on a timer value received in the configuration, etc. for determining a next period during which to report or at least determine the timing difference between the MCG and SCG (or related eNodeBs, cells, etc.).

In another example, the one or more parameters in the reporting configuration can relate to a trigger for comparing a determined timing difference between the cells or cell groups to a timing difference configured by or otherwise assumed by the network (e.g., by one or more of the cells or cell groups). In this example, timing difference reporting component 652 can report the timing difference to the MeNodeB 605-*a*, SeNodeB 605-*b*. etc. when the comparison between the timing differences results in a difference that achieves a threshold. For example, timing difference triggering component 654 may determine the assumed timing difference configured by the network and/or the threshold from the one or more parameters of the reporting configuration, from one or more parameters otherwise configured by a network at the UE 615, from a stored configuration at the UE 615, and/or the like. Thus, for example, timing difference determining component 650 may determine the timing difference between the first cell and second cell periodically (e.g., based on a periodic timer defined by timing difference triggering component 654, which may be based on the one or more parameters in the reporting configuration, as described above), and timing difference reporting component 652 may report the timing difference where the timing difference differs from the assumed timing difference by at least the threshold.

In another example, the one or more parameters in the reporting configuration can relate to a trigger for similarly comparing the determined timing difference between the first cell and second cell (or related cell groups) to a previously determined and/or reported timing difference of the first cell and second cell (or related cell groups), as determined by timing difference determining component 650 and/or as reported by timing difference reporting component 652. In this example, where the determined timing difference and the previously determined timing difference between the first cell and second cell (or related cell groups) differ by more than a threshold, timing difference reporting component 652 can report the timing difference to the MeNodeB 605-*a*, SeNodeB 605-*b*. etc. as described herein. For example, the threshold may be included in the one or more parameters of the reporting configuration received by timing difference triggering component 654.

In another example, the one or more parameters in the reporting configuration can relate to a trigger for determining a change in the number of subframes impacted by the timing difference change. For example, timing difference triggering component 654 can determine whether a timing difference between the first cell and second cell (or related cell groups) determined by timing difference determining component 650 impacts a larger number of subframes than a previously determined timing difference between the first cell and second cell (or related cell groups). As described, for example, the timing difference measured between the cells by timing difference determining component 650 may have some degree of inaccuracy and/or detecting a timing difference between the cells or cell groups may indicate some misalignment of subframe boundaries over communication links 625-a and 625-b. Thus, timing difference triggering component 654 can determine whether the detected timing difference within subframe boundaries (e.g., timing difference modulo the subframe_length) has moved from outside of a range corresponding to the inaccuracy $\delta$ (e.g., $\delta$<offset<subframe_length–$\delta$) in a previous time difference determination to inside the range corresponding to the inaccuracy $\delta$ (e.g., $\delta$>=offset or offset>=subframe_length–$\delta$) in the current time difference determination, and/or vice versa. Where the detected timing difference within the subframe boundaries has moved, timing difference reporting component 652 may determine to report the timing difference to MeNodeB 605-a, SeNodeB 605-b, etc., as described herein. It is to be appreciated that, timing difference determining component 650 can determine the possible timing inaccuracy $\delta$ for the UE 615 based on a configuration stored by the UE 615 or otherwise received by one or more network entities as one or more parameters in the reporting configuration or another configuration, etc.

In another example, the one or more parameters in the reporting configuration can relate to a prohibit timer, which can be initialized and managed by timing difference triggering component 654. Timing difference triggering component 654 can initialize the prohibit timer based on a timer value configured by the network (e.g., indicated in the one or more parameters in the reporting configuration, indicated in another configuration by MeNodeB 605-a, SeNodeB 605-b, or other network entities, etc.). Moreover, for example, timing difference triggering component 654 can initialize the prohibit timer after reporting a previous timing difference. Thereafter, timing difference determining component 650 can refrain from determining a timing difference, and/or timing difference reporting component 652 can refrain from reporting the timing difference, at least until after expiration of the prohibit timer is determined. After the prohibit timer expires, timing difference determining component 650 can determine a timing difference between the first cell and second cell, and/or timing difference reporting component 652 can report the timing difference. For example, determining the timing difference and/or reporting the timing difference may be additionally based on one or more of the other described triggers.

In another example, the one or more parameters in the reporting configuration can relate to a request received from the network to detect and report the timing (e.g., a request from MeNodeB 605-a, SeNodeB 605-b, or other network entities via one or more of the MeNodeB 605-a or SeNodeB-605-b).

Method 800 also includes, at Block 816, determining a timing difference between at least the first cell and at least the second cell. Timing difference determining component 650 can determine the timing difference between the first cell (e.g., a cell or cell group provided at least partially by MeNodeB 605-a) and the second cell (e.g., a cell or cell group provided at least partially by SeNodeB 605-b). As described, timing difference determining component 650 may determine the timing difference based on one or more of the parameters in the reporting configuration described above or otherwise (e.g., based on a defined periodicity). In addition, for example, timing difference determining component 650 can determine the timing difference based on one or more parameters received over respective communication links 625-a and 625-b (e.g., system information received from the MeNodB 605-a and/or SeNodeB 605-b). The timing difference may include a number of milliseconds, microseconds, or other measure of time between subframes or subframe boundaries of communication link 625-a and communication link 625-b, a number of subframes between a subframe number of communication link 625-a and a subframe number of communication link 625-b occurring in the same or overlapping time period, an indication of a SFN, subframe number, etc. and an associated actual time for the start of the SFN, subframe number etc. for both the MeNodeB 605-a and SeNodeB 605-b (or related cells or cell groups), and/or the like. As described, for example, timing difference determining component 650 can determine the subframe numbers for the cells in one or more time periods based on system information received from the respective MeNodeB 605-a and SeNodeB 605-b (e.g., in one or more MIBs).

Method 800 further includes, at Block 818, reporting the timing difference to at least the first cell over the first connection or to at least the second cell over the second connection based at least in part on the reporting configuration. Timing difference reporting component 652 can report the timing difference to at least the first cell (e.g., a cell or cell group of MeNodeB 605-a) over a first connection (e.g., communication link 625-a) or to at least the second cell (e.g., a cell or cell group of SeNodeB 605-b) over the second connection (e.g., communication link 625-b) based on the reporting configuration (e.g., as received by timing difference triggering component 654). In one example, timing difference reporting component 652 can report the timing difference based at least in part on the periodic time trigger described above such that the timing difference triggering component 654 can initialize the timer after each reporting of the timing difference, and timing difference reporting component 652 can report the timing difference based on expiration of the timer. In another example, as described, timing difference reporting component 652 can report the timing difference based at least in part on detecting that the timing difference differs from a timing difference indicated by the network (e.g., by MeNodeB 605-a or other network entity in the one or more parameters of the reporting configuration or other configuration) by at least a threshold. In yet another example, as described, timing difference reporting component 652 can report the timing difference based at least in part on detecting that the timing difference differs from a timing difference previously reported by timing difference reporting component 652 at least by a threshold. In a further example, as described, timing difference reporting component 652 can report the timing difference based at least in part on determining a change in the number of subframes impacted by the timing difference (e.g., based on a possible timing difference inaccuracy and/or subframe boundary misalignment). Still in another example, as described, timing difference reporting component 652 can report the timing difference based at least in part on detecting expiration of a prohibit timer that is initialized after a previous report of the timing difference.

In an example, timing difference reporting component 652 may report the timing difference in a radio resource control (RRC) message to the MeNodeB 605-a over the established connection therewith. In another example, timing difference reporting component 652 may report the timing difference to the SeNodeB 605-b in an RRC message over the established connection therewith, or in a media access control (MAC) control element (CE) where RRC resources are not yet established, as described further herein. As described, the reported timing difference can include a number of milliseconds, microseconds, subframes, SFNs, etc. between the timing of the SeNodeB 605-*b* and the MeNodeB 605-*a*, such that at least one of the SeNodeB 605-*b* and/or MeNodeB 605-*a* can determine one or more subframes that substantially align to subframes of the other eNodeB. In either case, as described further herein, the SeNodeB 605-*b* can utilize the timing difference and known timing information of certain operations of the MeNodeB 605-*a* (e.g., measurement gaps, DRX-on durations, etc.) to schedule communications with the UE 615 over communication link 625-*b*. In addition, in one example, timing difference reporting component 652 may report the timing difference based on one or more of the triggers described above. It is to be appreciated that timing difference determining component 650 may determine the timing difference according to one trigger (e.g., periodic timer) or parameter(s) specified in the reporting configuration, and timing difference reporting component 652 may report the timing difference based on another trigger or parameter(s) specified in the reporting configuration (e.g., based on comparing a difference between the timing difference and an assumed timing difference, previous timing difference, etc. to one or more thresholds).

Method 800 also optionally includes, at 820, receiving resources scheduled based at least in part on the reported timing difference. Communicating component 640 can receive resources scheduled based at least in part on the reported timing difference. As described above and further herein, SeNodeB 605-*b* can schedule resources for the UE 615 to perform one or more operations based on resources (e.g., subframes) scheduled for the UE 615 by MeNodeB 605-*a* to perform the operations adjusted by the reported timing difference (e.g., and/or including additional resources based on an inaccuracy of the reported timing difference).

FIG. 9 illustrates an example method 900 for suspending configuring aspects of a second connection with a second cell until the timing difference is reported. Method 900 includes, at Block 910, establishing a first connection served by at least a first cell. Communicating component 640 (FIG. 6) can establish the first connection served by at least the first cell, which can include communication link 625-*a* with MeNodeB 605-*a*. Method 900 also includes, at Block 912, receiving a configuration message to configure a second connection served by at least a second cell. Communicating component 640 can also receive the configuration message to configure the second connection served by at least the second cell. For example, the configuration message may include a connection reconfiguration message (e.g., an RRC Connection Reconfiguration message) or similar message received at an RRC layer or other network layer that facilitates configuring or otherwise establishing a radio connection between the UE 602 and an eNodeB (e.g., SeNodeB 605-*b*) or related cell. As described previously, the connections can be configured using multiple connectivity to provide the UE 615 with communications configured in an MCG and SCG. Configuring of the second connection, however, can be delayed until after a timing difference between the MeNodeB 605-*a* and SeNodeB 605-*b* is reported, such that configuring the second connection is based not only on receiving the configuration message but also on reporting the timing difference.

Method 900 also includes, at Block 914, determining a timing difference between at least the first cell and at least the second cell. For example, timing difference determining component 650 can determine the timing difference between a cell or cell group of MeNodeB 605-*a* and a cell or cell group of SeNodeB 605-*b*, as described with reference to FIG. 8 (e.g., and/or based on one or more triggers detected by timing difference triggering component 654). Method 900 also includes, at Block 916, reporting the timing difference to at least the first cell over the first connection. For example, timing difference reporting component 652 can report the timing difference, as described with reference to FIG. 8 (e.g., and/or based on one or more triggers detected by timing difference triggering component 654).

Method 900 also includes, at Block 918, configuring the second connection served by at least the second cell based at least in part on reporting the timing difference to at least the first cell. Connection configuring component 656 can configure the second connection (e.g., communication link 625-*b*) served by at least the second cell (e.g., a cell or cell group of SeNodeB 605-*b*) based at least in part on reporting the timing difference to at least the first cell (e.g., timing difference reporting component 652 reporting the timing difference to a cell or cell group of MeNodeB 605-*a*). Thus, for example, connection configuring component 656 can delay one or more aspects of configuring communications over the communication link 625-*b* (e.g., based on receiving the configuration message) until the timing difference is reported, until a response to reporting the timing difference is received (e.g., from MeNodeB 605-*a*), etc. In one example, connection configuring component 656 can delay establishment or configuring of the connection based on the received request to establish a connection until the timing difference is reported by timing difference reporting component 652.

In another example, communicating component 640 may have received a measurement gap configuration, DRX configuration, or similar configurations for communicating with MeNodeB 605-*a*. In this example, connection configuring component 656 can suspend such configurations (or related operations) at MeNodeB 605-*a* until timing difference reporting component 652 reports the timing difference between MeNodeB 605-*a* and SeNodeB 605-*b* (or between the related connections). In this regard, SeNodeB 605-*b* can determine the timing difference, and accordingly configure measurement gaps, DRX-on durations, etc. for communication link 625-*b*, as described (and thus connection configuring component 656 can resume the configurations once timing difference is reported or once a configuration of timing difference receipt is received). In one example, suspending the configurations in this regard can be based at least in part on receiving an indication from the network (e.g., MeNodeB 605-*a* or another network entity) to suspend the configurations until timing difference is reported. In yet another example, MeNodeB 605-*a* can deconfigure the configurations (e.g., the measurement gap configuration, DRX configuration, etc.) at the UE 615 until the timing difference is reported from the UE 615.

Figure 10:
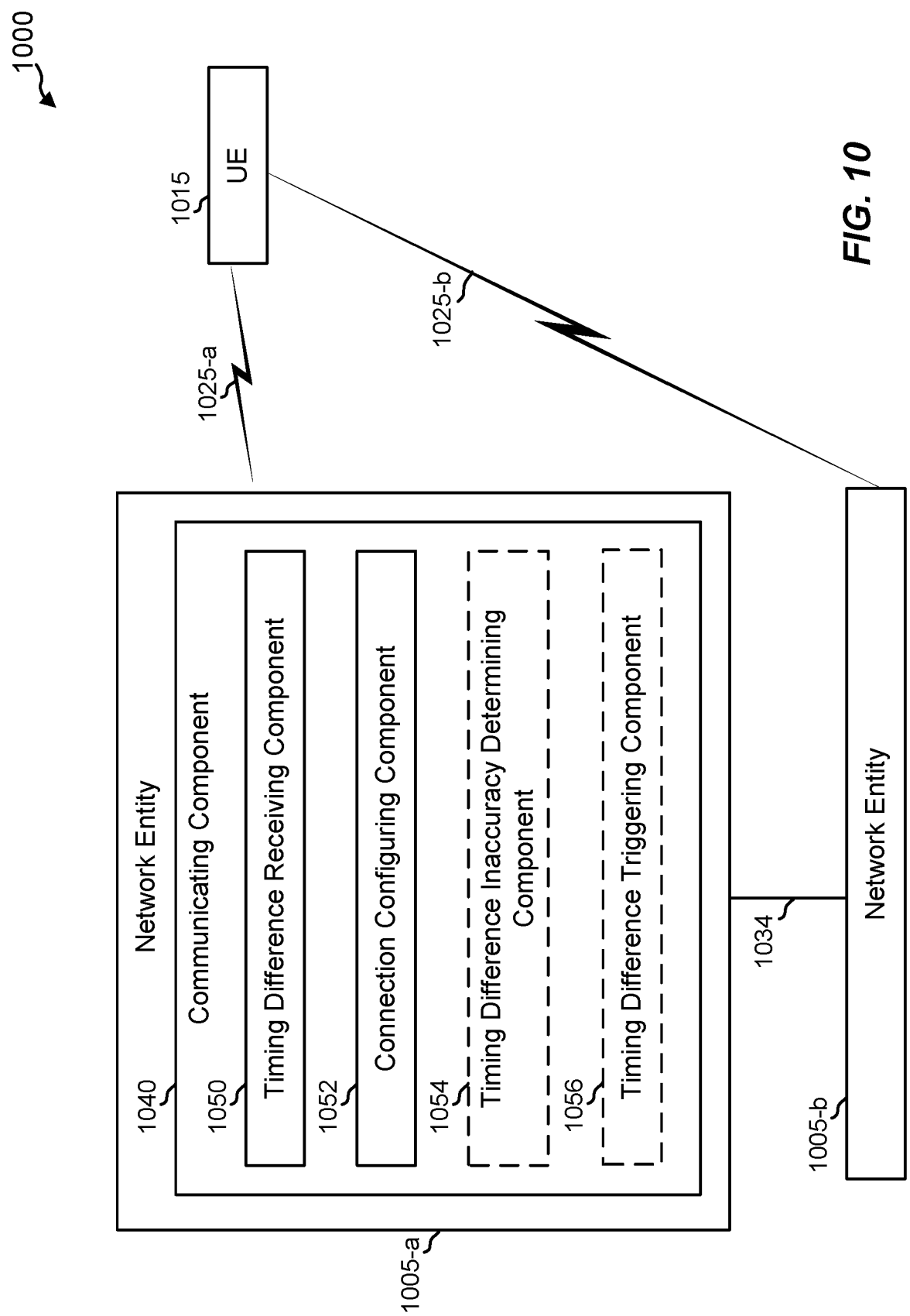
FIG. 10 is a block diagram conceptually illustrating an example of a network entity and components configured in accordance with various aspects of the present disclosure.
Figure 11:
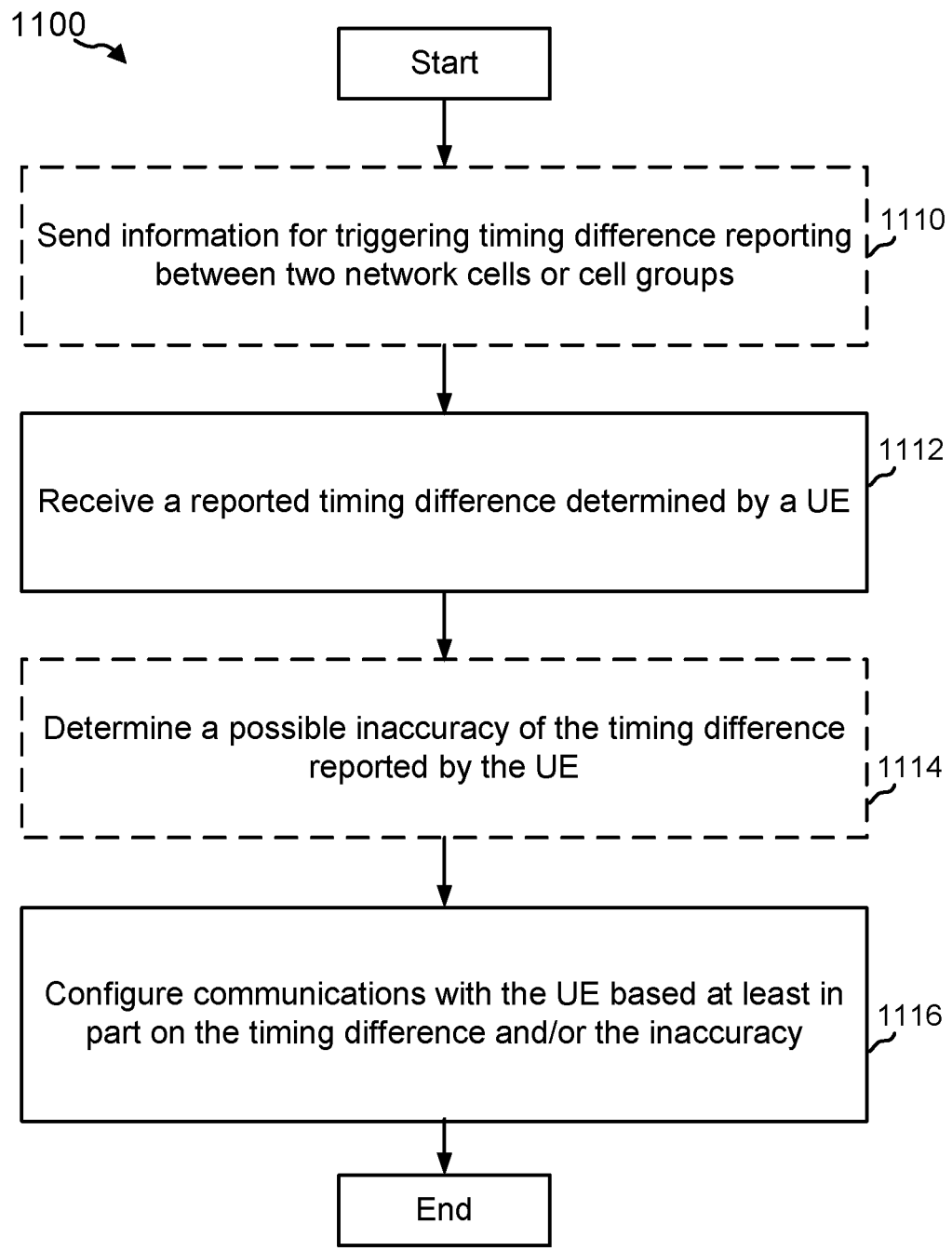
FIG. 11 is a flowchart illustrating a method for configuring a connection based on a reported timing difference in accordance with various aspects of the present disclosure.
Figure 12:
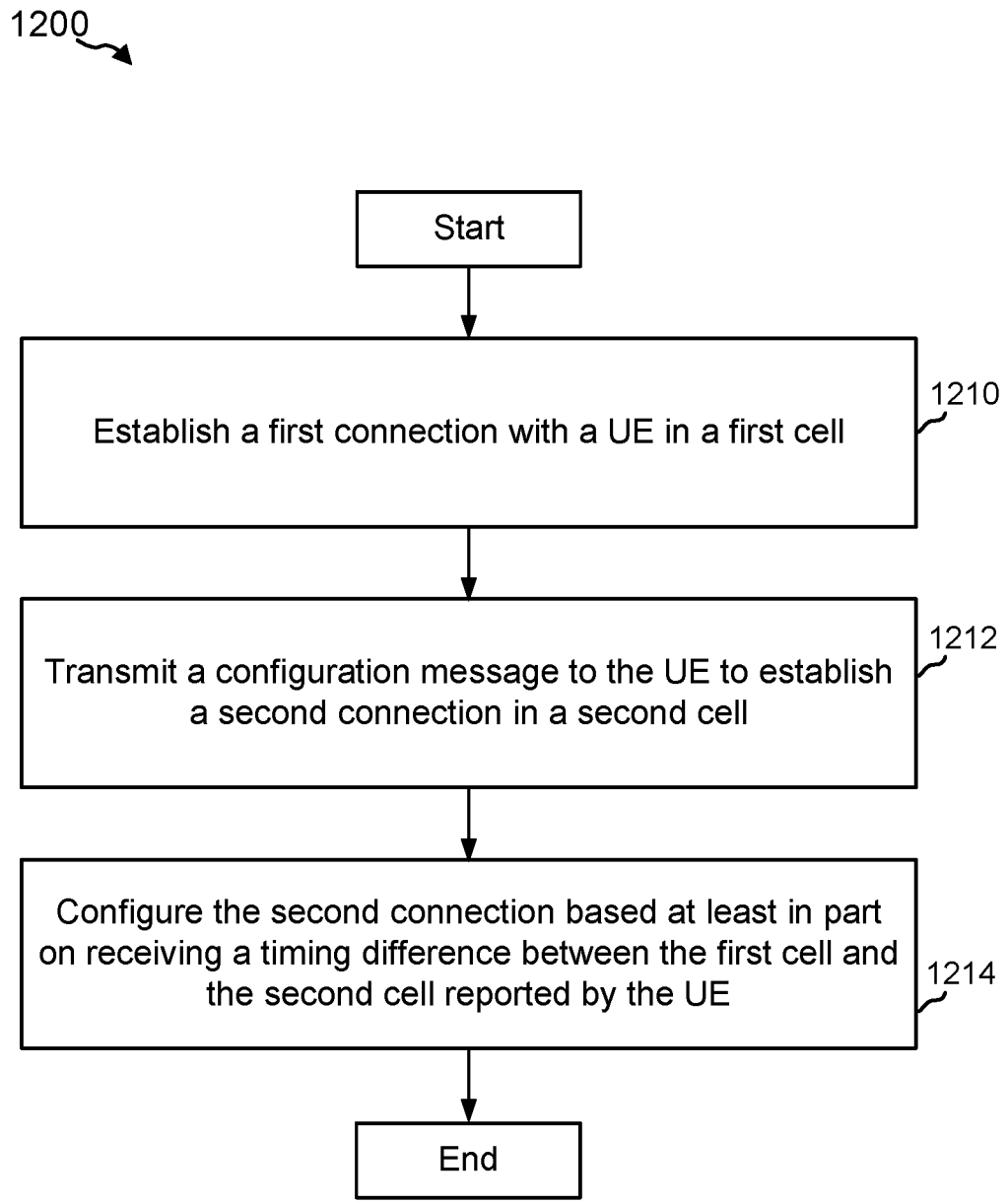
FIG. 12 is a flowchart illustrating a method for configuring a connection based on receiving a timing difference, in accordance with various aspects of the present disclosure.

FIG. 10 is a block diagram 1000 conceptually illustrating an example of a network entity 1005-*a* and components configured in accordance with an aspect of the present disclosure. FIGS. 11 and 12, which are described in conjunction with FIG. 10 herein, illustrate example methods 1100 and 1200 in accordance with aspects of the present disclosure. Although the operations described below in FIGS. 11 and 12 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 10, diagram 1000 includes network entities 1005-a, 1005-b, which can include one or more previously described base stations/eNodeBs (e.g., MeNodeB 605-a that provides a PCell$_{MCG}$, SeNodeB that provides a PCell$_{SCG}$, etc.), or other network entities, along with a UE 1015, which can include one or more previously described UEs (e.g., UE 615). The network entity 1005-a and the UE 1015 may communicate over communication link 1025-a, network entity 1005-b and UE 1015 may communicate over communication link 1025-b, and network entities 1005-a and 1005-b may communicate over a backhaul link 1034. UE 1015 may be configured to determine and report a timing difference between the network entity 1005-a and network entity 1005-b (and/or other network entities), as described herein. Network entity 1005-a includes a communicating component 1040 for obtaining and utilizing a timing difference report received from a UE in scheduling communications for the UE. It is to be appreciated that network entity 1005-b may also include a communicating component 1040 and/or components thereof to perform the functions described herein, but these components are omitted for ease of explanation.

Communicating component 1040 can include, or can be in communication with, a timing difference receiving component 1050 for receiving a timing difference between the network entity 1005-a and another network entity from a UE, and a connection configuring component 1052 for configuring a connection with the UE based at last in part on the received timing difference. Communicating component 1040 can optionally include, or can be in communication with, a timing difference inaccuracy determining component 1054 for determining a possible inaccuracy of a received timing difference, and/or a timing difference triggering component 1056 for triggering timing difference reporting to the UE.

FIG. 11 illustrates an example method 1100 for configuring communications with a UE based on a received timing difference. Method 1100 optionally includes, at Block 1110, sending information for triggering timing difference reporting between two cells or cell groups. Timing difference triggering component 1056 (FIG. 10) can send the information for triggering timing difference reporting between two cells or cell groups to UE 1015. For example, the information can include a request for the UE 1015 to determine and report the timing difference between network entities 1005-a and 1005-b (or related cells or cell groups), a type of trigger to detect for determining to determine and/or report a timing difference between cells or cell groups, a periodic timer value according to which UE 1015 should determine and report timing difference, a threshold timing difference between network entities 1005-a and 1005-b (or related cells or cell groups) that the UE 1015 should report when achieved, a prohibit timer value to which UE 1015 should adhere in reporting timing difference, and/or the like, as described. In other examples, as described, the UE 1015 can determine the trigger based on information configured at the UE 1015, in which case Block 1110 may not be included in the method 1100.

Method 1100 includes, at Block 1112, receiving a reported timing difference determined by a UE. Timing difference receiving component 1050 can receive the reported timing difference determined by UE 1015. For example, the timing difference can indicate a timing difference between network entities 1005-a and 1005-b (or related cells or cell groups) over related communication links 1025-a and 1025-b, which may be expressed as a duration in time computed based on system information received from network entities 1005-a and 1005-b (e.g., a number of milliseconds or microseconds), start of a SFN or subframe corresponding to certain system times, etc. The reported timing difference can enable network entity 1005-a to configure certain operations with the UE 1015 such that the operations are substantially time aligned with similar operations of network entity 1005-b based on the reported timing difference. In an example, the timing difference report can be received from the UE 1015 and/or from another entity in the wireless network (e.g., network entity 1005-b over backhaul link 1034).

Method 1100 optionally includes, at Block 1114, determining a possible inaccuracy of the timing difference reported by the UE. Timing difference inaccuracy determining component 1054 can determine the possible timing inaccuracy of the timing difference reported by the UE 1015 (e.g., as received by timing difference receiving component 1050). For example, timing difference inaccuracy determining component 1054 can determine the possible timing inaccuracy based on a class or configuration related to the UE 1015.

Method 1100 also includes, at Block 1116, configuring communications with the UE based at least in part on the timing difference and/or the inaccuracy. Connection configuring component 1052 can configure the communications with the UE 1015 (e.g., communication link 1025-a) based at least in part on the timing difference (e.g., as reported by the UE 1015 and received at timing difference receiving component 1050) and/or the inaccuracy (e.g., as determined by timing difference inaccuracy determining component 1054). Connection configuring component 1052 can also configure the communications with UE 1015 based on resources (e.g., subframes) configured by network entity 1005-b, which may be indicated to network entity 1005-a via backhaul link 1034). As described, network entity 1005-a can determine a possible inaccuracy in timing estimation performed by UE 1015 according to a δ value, which can be configured at the network entity 1005 based on a configuration, a type of UE 1015, etc. Timing difference inaccuracy determining component 1054 can determine whether to consider this possible inaccuracy in evaluating the timing difference received from the UE 1015 for configuring communications therewith via connection configuring component 1052.

In one example, the timing inaccuracy expected for the UE 1015 may be small such that the timing difference reported by the UE 1015 is expected to have high accuracy (e.g., less than half a symbol of possible inaccuracy). In this example, and where network entities 1005-a and 1005-b are aligned in subframe boundary (e.g., in example 1 described in timing difference 700 of FIG. 7), connection configuring component 1052 can configure the connection with the UE 1015 based on rounding the reported timing difference to the next or previous subframe length multiple (e.g., which ever results in the lesser difference value between the reported timing difference and the rounded timing difference) and adjusting for the number of subframes indicated by the timing difference. In this regard, connection configuring component 1052 can configure the connection with the UE 1015 to use a same number of subframes for certain operations (e.g., measurement gaps, DRX-on duration, etc.) that are aligned to those used by the other eNodeB without including additional subframes.

In another example, the timing inaccuracy expected for the UE 1015 may be larger such that the timing difference reported by the UE 1015 may not be as accurate (e.g., having more than half a symbol of possible inaccuracy), and the timing difference may indicate a misalignment in subframe boundaries (e.g., where the timing difference modulo the subframe length is greater than a threshold). In this example, timing difference inaccuracy determining component 1054 may consider possible inaccuracy in the timing difference reported by the UE 1015 (e.g., as in examples 2 and 3 in timing differences 702 and 704 in FIG. 7). For example, timing difference inaccuracy determining component 1054 can obtain a maximum possible inaccuracy, and can determine whether the timing difference received from the UE 1015 indicates a subframe boundary offset that is within the possible inaccuracy or not. For example, as described, timing difference inaccuracy determining component 1054 can determine whether the subframe boundary offset (e.g., the received timing offset modulo the subframe length) is greater than the inaccuracy δ and less than 1−δ. In this case, the subframe boundary offset is not within the inaccuracy δ, and connection configuring component 1052 can determine whether the network entity 1005-*a* is ahead or behind the network entity 1005-*b* in timing, and thus whether to schedule an additional subframe at the beginning or end of the configured subframes, respectively, for one or more operations (e.g., measurement gap, DRX, etc.) in aligning with the network entity 1005-*b*, as described. Where timing difference inaccuracy determining component 1054 determines that the subframe boundary offset is less than the inaccuracy δ or greater than 1−δ, this indicates the subframe boundary offset is within the δ, and connection configuring component 1052 can schedule an additional subframe at the beginning and an additional subframe at the end of the configured subframes for one or more operations (e.g., measurement gap, DRX, etc.) in aligning with the other eNodeB, as described.

FIG. 12 illustrates an example method 1200 for configuring communications with a UE based on a received timing difference. Method 1200 optionally includes, at Block 1210, establishing a first connection with a UE in a first cell. Communicating component 1040 can establish the first connection (e.g., communication link 1025-*a*) with the UE 1015 in the first cell (which may include a cell or cell group provided by network entity 1005-*a*). It is to be appreciated, in this example, that network entity 1005-*a* may be the MeNodeB. Method 1200 can also include, at Block 1212, transmitting a configuration message to the UE to establish a second connection in a second cell. Communicating component 1040 can also send the configuration message to the UE 1015 to establish another connection with the second cell, which may be provided by network entity 1005-*b* (e.g., a SeNodeB).

As described, for example, receiving the configuration at the UE 1015 can cause the UE 1015 to determine a timing difference between the first and second cell to facilitate time aligning of certain operations at the cells (e.g., measurement gaps, DRX durations, etc.). Thus, method 1200 also includes, at Block 1214, configuring the second connection based at least in part on receiving a timing difference between the first cell and the second cell reported by the UE. Connection configuring component 1052 can configure the connection based at least in part on receiving the timing difference. For example, connection configuring component 1052 can suspend measurement gaps, DRX durations, and related operations between transmitting the configuration message to the UE 1015 and receiving the timing difference report from the UE 1015. In another example, configuring the connection can include providing the timing difference information to the network entity 1005-*b* (e.g., via backhaul link 1034) to allow the network entity 1005-*b* to establish the connection with the UE 1015 and schedule certain operations, such as measurement gaps, DRX durations, etc., such to align timing thereof with the network entity 1005-*a* based on the timing difference (e.g., as described in reference to FIG. 11).

Figure 13:
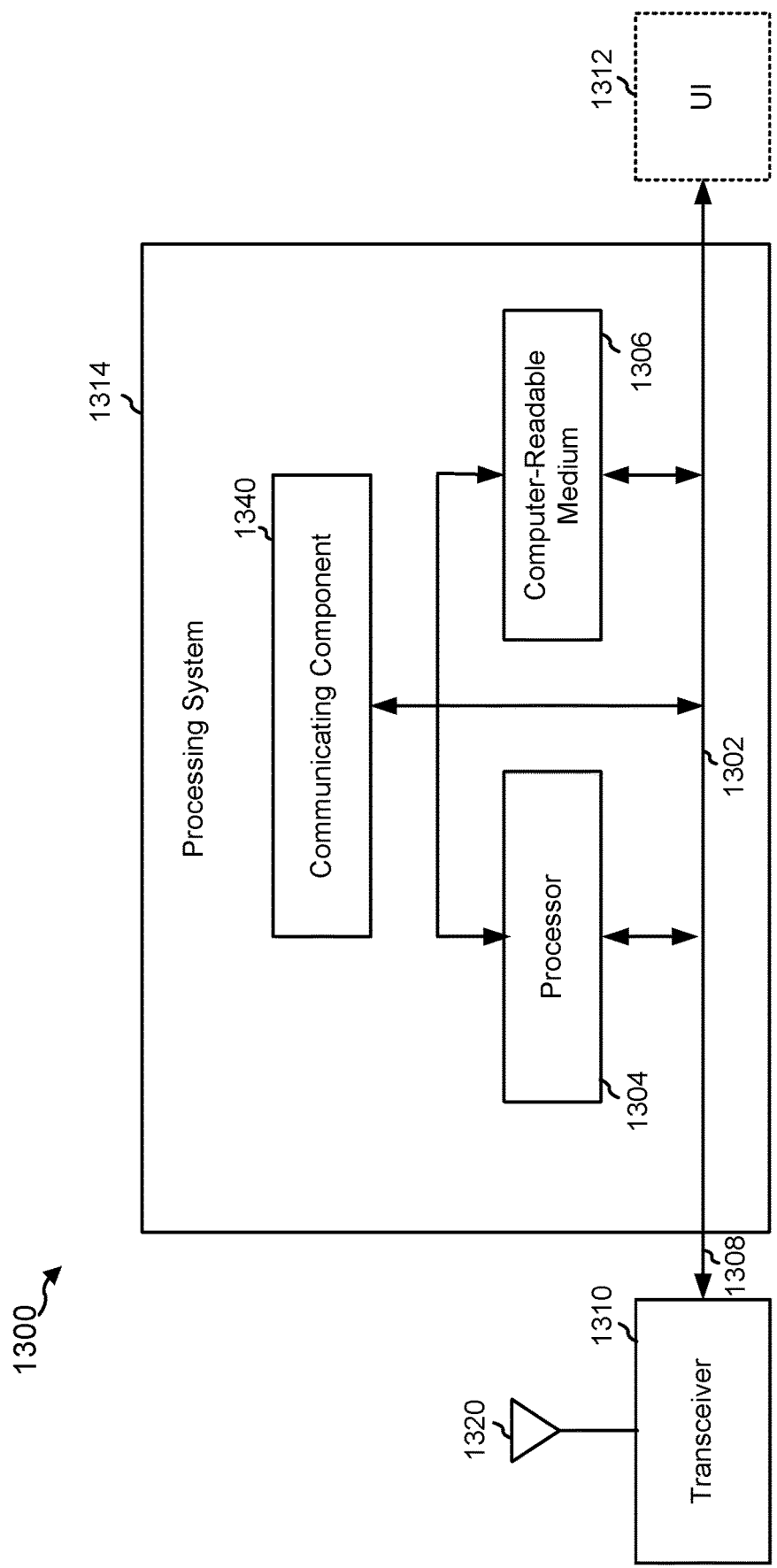
FIG. 13 is a block diagram conceptually illustrating an example hardware implementation for an apparatus employing a processing system configured in accordance with various aspects of the present disclosure.

FIG. 13 is a block diagram conceptually illustrating an example hardware implementation for an apparatus 1300 employing a processing system 1314 configured in accordance with an aspect of the present disclosure. The processing system 1314 includes a communicating component 1340. In one example, the apparatus 1300 may be the same or similar, or may be included with one of the UEs, eNodeBs, network entities, etc. described in various Figures. In such example, the communicating component 1340 may correspond to, for example, the communicating component 640 of UE 615, communicating component 1040 of network entity 1005-*a*, etc., and may thus include or otherwise be coupled to the components thereof to provide the functions described herein. In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 links together various circuits including one or more processors (e.g., central processing units (CPUs), microcontrollers, application specific integrated circuits (ASICs), field programmable gate arrays (FPGAs)) represented generally by the processor 1304, and computer-readable media, represented generally by the computer-readable medium 1306. The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310, which is connected to one or more antennas 1320 for receiving or transmitting signals. The transceiver 1310 and the one or more antennas 1320 provide a mechanism for communicating with various other apparatus over a transmission medium (e.g., over-the-air). Depending upon the nature of the apparatus, a user interface (UI) 1312 (e.g., keypad, display, speaker, microphone, joystick) may also be provided.

The processor 1304 is responsible for managing the bus 1302 and general processing, including the execution of software stored on the computer-readable medium 1306. The software, when executed by the processor 1304, causes the processing system 1314 to perform the various functions described herein for any particular apparatus. The computer-readable medium 1306 may also be used for storing data that is manipulated by the processor 1304 when executing software. The communicating component 1340 as described above may be implemented in whole or in part by processor 1304, or by computer-readable medium 1306, or by any combination of processor 1304 and computer-readable medium 1306.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for reporting difference in timing between cells using multiple connectivity in a wireless network, comprising:
    establishing a first connection served by at least a first cell, the first connection is established with a master cell group including at least the first cell as a primary cell of the master cell group;
    establishing a second connection served by at least a second cell, the second connection is established with a secondary cell group including at least the second cell as a primary cell of the secondary cell group;
    receiving, from at least one of the first cell or the second cell, a reporting configuration specifying one or more parameters related to reporting a timing difference between at least the first cell and at least the second cell, wherein the one or more parameters include a request to report an offset in subframe alignment between at least the first cell as the primary cell of the master cell group and at least the second cell as the primary cell of the secondary cell group;
    and
    reporting, based at least in part on receiving the request, the timing difference as the offset in subframe alignment to at least the first cell over the first connection or to at least the second cell over the second connection, wherein reporting the timing difference is based at least in part on detecting expiration of a prohibit timer.

2. The method of claim 1, further comprising configuring one or more additional parameters for communicating over the first connection or the second connection based at least in part on the timing difference.

3. The method of claim 2, wherein the one or more additional parameters correspond to measurement gaps defined for the first connection or the second connection.

4. The method of claim 2, wherein the one or more additional parameters correspond to a discontinuous receive duration defined for the first connection or the second connection.

5. The method of claim 1, further comprising receiving a connection reconfiguration message to configure the second connection served by at least the second cell, wherein reporting the timing difference is further based at least in part on receiving the reporting configuration, and wherein establishing the second connection includes configuring the second connection based at least in part on receiving the connection reconfiguration message and reporting the timing difference.

6. The method of claim 1, wherein reporting the timing difference is further based at least in part on detecting expiration of a periodic timer, wherein the one or more parameters relate to the periodic timer.

7. The method of claim 1, wherein reporting the timing difference is further based at least in part on determining that the timing difference differs from an assumed timing difference by at least a threshold, wherein the one or more parameters relate to the assumed timing difference or the threshold.

8. The method of claim 1, wherein reporting the timing difference is further based at least in part on determining that the timing difference differs from a previously reported timing difference by at least a threshold, wherein the one or more parameters relate to the threshold.

9. An apparatus for reporting difference in timing between cells using multiple connectivity in a wireless network, comprising:
a memory; and
at least one processor coupled to the memory, wherein the at least one processor is configured to:
establish a first connection served by at least a first cell, the first connection is established with a master cell group including at least the first cell as a primary cell of the master cell group;
establish a second connection served by at least a second cell, the second connection is established with a secondary cell group including at least the second cell as a primary cell of the secondary cell group;
receive, from at least one of the first cell or the second cell, a reporting configuration specifying one or more parameters related to reporting a timing difference between at least the first cell and at least the second cell, wherein the one or more parameters include a request to report an offset in subframe alignment between at least the first cell as the primary cell of the master cell group and at least the second cell as the primary cell of the secondary cell group; and
report, based at least in part on receiving the request, the timing difference as the offset in subframe alignment to at least the first cell over the first connection or to at least the second cell over the second connection, wherein the at least one processor is configured to report the timing difference based at least in part on detecting expiration of a prohibit timer.

10. The apparatus of claim 9, wherein the at least one processor is further configured to configure one or more additional parameters for communicating over the first connection or the second connection based at least in part on the timing difference.

11. The apparatus of claim 10, wherein the one or more additional parameters correspond to measurement gaps defined for the first connection or the second connection.

12. The apparatus of claim 10, wherein the one or more additional parameters correspond to a discontinuous receive duration defined for the first connection or the second connection.

13. The apparatus of claim 9, wherein the at least one processor is further configured to receive a connection reconfiguration message to configure the second connection served by at least the second cell, wherein the at least one processor is configured to report the timing difference further based at least in part on receiving the reporting configuration, and wherein the at least one processor is configured to establish the second connection at least in part by configuring the second connection based at least in part on receiving the connection reconfiguration message and reporting the timing difference.

14. The apparatus of claim 9, wherein the at least one processor is configured to report the timing difference further based at least in part on detecting expiration of a periodic timer, wherein the one or more parameters relate to the periodic timer.

15. The apparatus of claim 9, wherein the at least one processor is configured to report the timing difference further based at least in part on determining that the timing difference differs from an assumed timing difference by at least a threshold, wherein the one or more parameters relate to the assumed timing difference or the threshold.

16. The apparatus of claim 9, wherein the at least one processor is configured to report the timing difference further based at least in part on determining that the timing difference differs from a previously reported timing difference by at least a threshold, wherein the one or more parameters relate to the threshold.

17. An apparatus for reporting difference in timing between cells using multiple connectivity in a wireless network, comprising:
means for establishing a first connection served by at least a first cell, the first connection is established with a master cell group including at least the first cell as a primary cell of the master cell group;
means for establishing a second connection served by at least a second cell, the second connection is established with a secondary cell group including at least the second cell as a primary cell of the secondary cell group;
means for receiving, from at least one of the first cell or the second cell, a reporting configuration specifying one or more parameters related to reporting a timing difference between at least the first cell and at least the second cell, wherein the one or more parameters include a request to report an offset in subframe alignment between at least the first cell as the primary cell of the master cell group and at least the second cell as the primary cell of the secondary cell group; and
means for reporting, based at least in part on receiving the request, the timing difference as the offset in subframe alignment to at least the first cell over the first connection or to at least the second cell over the second connection, wherein the means for reporting reports the timing difference based at least in part on detecting expiration of a prohibit timer.

18. The apparatus of claim 17, further comprising means for configuring one or more additional parameters for communicating over the first connection or the second connection based at least in part on the timing difference.

19. The apparatus of claim 18, wherein the one or more additional parameters correspond to measurement gaps defined for the first connection or the second connection.

20. The apparatus of claim 18, wherein the one or more additional parameters correspond to a discontinuous receive duration defined for the first connection or the second connection.

21. The apparatus of claim 17, further comprising means for receiving a connection reconfiguration message to configure the second connection served by at least the second cell, wherein the means for reporting reports the timing difference further based at least in part on receiving the reporting configuration, and wherein the means for establishing the second connection configures the second connection based at least in part on receiving the connection reconfiguration message and reporting the timing difference.

22. The apparatus of claim 17, wherein the means for reporting reports the timing difference further based at least in part on detecting expiration of a periodic timer, wherein the one or more parameters relate to the periodic timer.

23. The apparatus of claim 17, wherein the means for reporting reports the timing difference further based at least in part on determining that the timing difference differs from an assumed timing difference by at least a threshold, wherein the one or more parameters relate to the assumed timing difference or the threshold.

24. A non-transitory computer-readable storage medium comprising computer-executable code for reporting difference in timing between cells using multiple connectivity in a wireless network, the code comprising:
   code for establishing a first connection served by at least a first cell, the first connection is established with a master cell group including at least the first cell as a primary cell of the master cell group;
   code for establishing a second connection served by at least a second cell, the second connection is established with a secondary cell group including at least the second cell as a primary cell of the secondary cell group;
   code for receiving, from at least one of the first cell or the second cell, a reporting configuration specifying one or more parameters related to reporting a timing difference between at least the first cell and at least the second cell, wherein the one or more parameters include a request to report an offset in subframe alignment between at least the first cell as the primary cell of the master cell group and at least the second cell as the primary cell of the secondary cell group; and
   code for reporting, based at least in part on receiving the request, the timing difference as the offset in subframe alignment to at least the first cell over the first connection or to at least the second cell over the second connection, wherein the code for reporting reports the timing difference based at least in part on detecting expiration of a prohibit timer.

25. The non-transitory computer-readable storage medium of claim 24, further comprising code for configuring one or more additional parameters for communicating over the first connection or the second connection based at least in part on the timing difference.

26. The non-transitory computer-readable storage medium of claim 25, wherein the one or more additional parameters correspond to measurement gaps defined for the first connection or the second connection.

27. The non-transitory computer-readable storage medium of claim 25, wherein the one or more additional parameters correspond to a discontinuous receive duration defined for the first connection or the second connection.

28. The non-transitory computer-readable storage medium of claim 24, further comprising code for receiving a connection reconfiguration message to configure the second connection served by at least the second cell, wherein the code for reporting reports the timing difference further based at least in part on receiving the reporting configuration, and wherein the code for establishing the second connection configures the second connection based at least in part on receiving the connection reconfiguration message and reporting the timing difference.

29. The non-transitory computer-readable storage medium of claim 24, wherein the code for reporting reports the timing difference further based at least in part on detecting expiration of a periodic timer, wherein the one or more parameters relate to the periodic timer.

30. The non-transitory computer-readable storage medium of claim 24, wherein the code for reporting reports the timing difference further based at least in part on determining that the timing difference differs from an assumed timing difference by at least a threshold, wherein the one or more parameters relate to the assumed timing difference or the threshold.

* * * * *